(12) United States Patent
Yabuuchi et al.

(10) Patent No.: US 10,691,973 B2
(45) Date of Patent: Jun. 23, 2020

(54) IMAGE SCANNING DEVICE, IMAGE FORMING APPARATUS, IMAGE SCANNING METHOD, AND IMAGE SCANNING PROGRAM

(71) Applicants: Masayuki Yabuuchi, Kanagawa (JP); Naoki Goh, Tokyo (JP)

(72) Inventors: Masayuki Yabuuchi, Kanagawa (JP); Naoki Goh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 243 days.

(21) Appl. No.: 15/951,508

(22) Filed: Apr. 12, 2018

(65) Prior Publication Data

US 2018/0330186 A1 Nov. 15, 2018

(30) Foreign Application Priority Data

May 9, 2017 (JP) .................................. 2017-093104

(51) Int. Cl.
| | |
|---|---|
| *G06K 9/62* | (2006.01) |
| *H04N 1/00* | (2006.01) |
| *G06K 9/00* | (2006.01) |
| *G06K 9/20* | (2006.01) |

(52) U.S. Cl.
CPC ....... *G06K 9/6202* (2013.01); *G06K 9/00355* (2013.01); *G06K 9/00442* (2013.01); *G06K 9/2054* (2013.01); *H04N 1/00251* (2013.01); *H04N 1/00827* (2013.01); *H04N 2201/0091* (2013.01)

(58) Field of Classification Search
None
See application file for complete search history.

(56) References Cited

U.S. PATENT DOCUMENTS

| | | | | |
|---|---|---|---|---|
| 2013/0298069 | A1* | 11/2013 | Petschnigg | G06F 3/0483 715/776 |
| 2017/0244853 | A1 | 8/2017 | Yabuuchi et al. | |

FOREIGN PATENT DOCUMENTS

| | | |
|---|---|---|
| JP | 11-252351 | 9/1999 |
| JP | 2007-067966 | 3/2007 |
| JP | 2014-168235 | 9/2014 |

* cited by examiner

*Primary Examiner* — Vikkram Bali
(74) *Attorney, Agent, or Firm* — Harness, Dickey & Pierce, P.L.C.

(57) ABSTRACT

An image scanning device including an image sensor, an operation unit, and circuitry. The circuitry acquires reference-image data and comparative-image data output from the image sensor when a predetermined time elapses after acquiring the reference-image data. The circuitry further divides each of the reference-image data and the comparative-image data into a plurality of image areas, extracts a feature point of a given pixel for each of the plurality of image areas of each of the reference-image data and the comparative-image data, compares pixel values of feature points in the same coordinate to determine a difference in pixel value, identifies an image area including at least one feature point having a difference in pixel value, and identifies a direction of flip of pages of the document based on the image area including the at least one feature point having the difference in pixel value.

10 Claims, 13 Drawing Sheets

FIG. 5A
FIG. 5B
FLIP TO LEFT
FLIP TO RIGHT
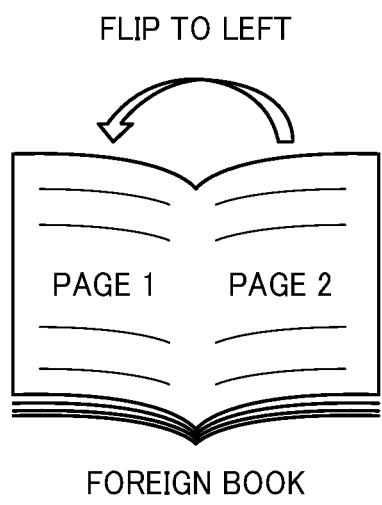
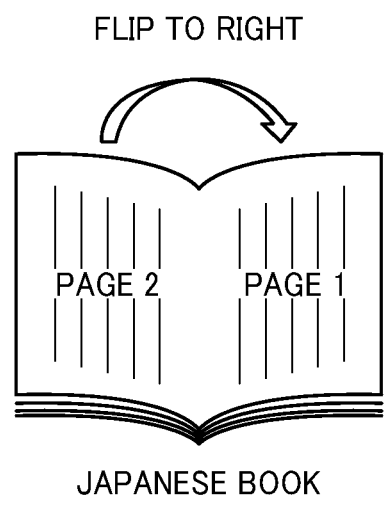
FOREIGN BOOK
JAPANESE BOOK

IMAGE SCANNING DEVICE, IMAGE FORMING APPARATUS, IMAGE SCANNING METHOD, AND IMAGE SCANNING PROGRAM

CROSS-REFERENCE TO RELATED APPLICATIONS

This patent application is based on and claims priority pursuant to 35 U.S.C. § 119(a) to Japanese Patent Application No. 2017-093104, filed on May 9, 2017, in the Japan Patent Office, the entire disclosure of which is hereby incorporated by reference herein.

BACKGROUND

Technical Field

This disclosure relates to an image scanning device, an image forming apparatus, a method for scanning an image, and an image scanning program.

Background Art

A "top shot" scanner has been known as one specific type of scanners that scan and acquire image data of a document including a plurality of pages, such as a book, placed facing upward on a document table, using an imaging device disposed above the document table. In scanning a document with right and left facing pages, such a top shot scanner sometimes divides the document including right and left facing pages into page units and stores the divided image data in a memory. In sorting the divided image data in order of page number, determining which one of right and left facing pages is a leading page depends on a direction of flip of pages of the document that varies with the type of document.

Hence, the direction of flip of pages is preferably set in advance.

SUMMARY

In one aspect of this disclosure, there is provided an improved image scanning device including an image sensor, an operation unit, and circuitry. The image sensor is configured to capture an image of a document including a plurality of pages with a predetermined frequency and output a plurality of pieces of image data and the document is placed to allow flipping the pages. The operation unit is configured to receive an instruction to perform scanning the document, from an outside. The circuitry is configured to acquire reference-image data out of the plurality of pieces of image data output by the image sensor in response to a reception of the instruction by the operation unit, and acquire comparative-image data output from the image sensor when a given time elapses after acquiring the reference-image data. The circuitry is further configured to divide each of the reference-image data and the comparative-image data into a plurality of image areas, extract a feature point of a given pixel for each of the plurality of image areas of each of the reference-image data and the comparative-image data, compare pixel values of the feature points in a coordinate common between the reference-image data and the comparative-image data to determine a difference in pixel value in the coordinate common between the reference-image data and the comparative-image data, identify an image area including at least one feature point having a difference in pixel value in the common coordinate, from the divided plurality of image areas based on the difference between the reference-image data and the comparative-image data, and identify a direction of flip of pages of the document based on the image area including the at least one feature point having a difference in pixel value.

In another aspect of this disclosure, there is provided an improved image forming apparatus including the above-described image scanning device.

In still another aspect of this disclosure, there is provided an improved image scanning method including capturing an image of a document including a plurality of pages with a predetermined frequency to output a plurality of pieces of image data, the document being placed to allow flipping the pages; receiving an instruction to perform scanning the document, from an outside; acquiring reference-image data out of the plurality of pieces of image data output in response to a reception of the instruction in the receiving; acquiring comparative-image data when a predetermined time elapses after acquiring the reference-image data in the acquiring; dividing each of the reference-image data and the comparative-image data into a plurality of image areas; extracting a feature point of a given pixel for each of the plurality of image areas of each of the reference-image data and the comparative-image data; comparing pixel values of the feature points in a common coordinate between the reference-image data and the comparative-image data to determine a difference in pixel value in the common coordinate between the reference-image data and the comparative-image data; identifying an image area including at least one feature point having a difference in pixel value in the common coordinate, from the plurality of image areas divided in the dividing, based on the difference between the reference-image data and the comparative-image data; and identifying a direction of flip of pages of the document based on the image area including the at least one feature point having the difference in pixel value.

In yet another aspect of this disclosure, there is provided an improved non-transitory computer readable storage medium storing a program that causes the above-described image scanning method.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 5A and 5B are illustrations of examples of flipping a page of a document;

Figure 1:
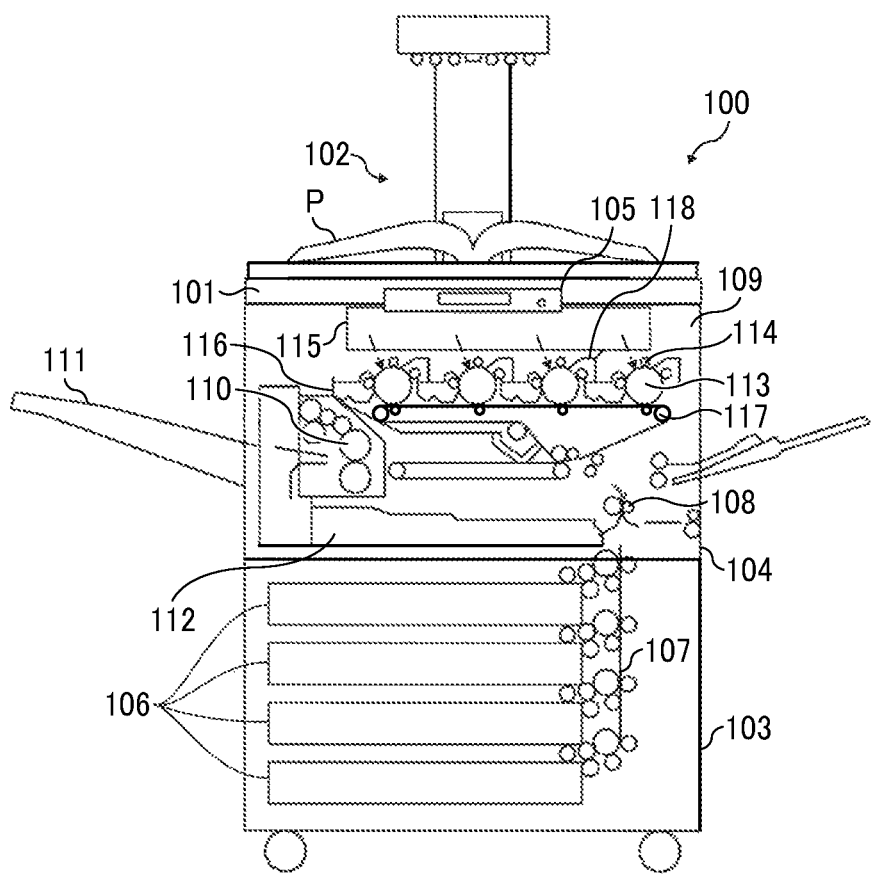
FIG. 1 is a schematic view of an image forming apparatus including a document scanner according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

FIG. 1 is a schematic view of an image forming apparatus 100 including an image scanning device according to an embodiment of the present disclosure. In the present embodiment, the image forming apparatus 100 is, for example, an electrophotographic apparatus. The image forming apparatus 100 includes, for example, a scanner 101 (first document scanner), a document scanner 102 (second document scanner), a sheet feeder 103, an image forming unit 104, and an operation unit 105. In FIG. 1, a document scanner 102 serves as an image scanning device (image scanner, image scanning device). However, the image forming apparatus 100 may be used as an image scanning device.

The scanner 101 is, for example, a flatbed scanner. A user opens a flatbed cover and places a document P on the glass plate, the document P having the document surface facing downward. The scanner 101 reads (scans) the document P by moving a line-image sensor provided on the lower side of the glass plate.

The document scanner 102 is, for example, a "top-shot scanner". The configuration of the document scanner 102 will be described later. The sheet feeder 103 includes a plurality of sheet feeding trays 106, and supplies a sheet of paper to the image forming unit 104 through a conveyance path 107.

The operation unit 105 includes a touch panel and a plurality of keys. In accordance with an operation of the user input to the operation unit 105, the image forming apparatus 100 controls an operation or changes the setting, displaying the operating state for the user. The operation unit 105 is disposed in the document scanner 102.

The image forming unit 104 includes a registration roller pair 108, a tandem image forming device 109, a fixing device 110, an output tray 111, and a duplex tray 112. The image forming device 109 includes a photoconductor drum 113, a charging unit 114, an optical writing unit 115, a developing unit 116, an intermediate transfer belt 117, and a cleaner 118.

The image forming device 109 includes four photoconductor drums 113 for yellow (Y), magenta (M), cyan (C), and black (K) arranged in this order. Around each photoconductor drum 113, a corresponding charging unit 114, a corresponding developing unit 116, and a corresponding cleaner 118 are disposed. Further, the intermediate transfer belt 117 stretching between a drive roller and a driven roller is disposed at a position to contact each photoconductor drum 113.

The image forming apparatus 100 takes out a sheet from an appropriate one of the sheet feeding trays 106, the appropriate one storing sheets of an appropriate size and orientation. Subsequently, the image forming apparatus 100 conveys the sheet to the registration roller pair 108 through a conveyance path 107. The registration roller pair 108 serves to feed the sheet to the image forming device 109 at a predetermined timing.

The image forming device 109 employs the charging unit 114 used to uniformly charge the photoconductor drums 113 for the respective colors Y, M, C, and K to a predetermined polarity. Next, the optical writing unit 115 illuminates the surface of the photoconductor drum 113 with laser light based on desired-image data to thereby form an electrostatic latent image. The electrostatic latent image is developed with toner for the respective colors by the developing unit 116, thus to form toner images for the colors on the photoconductor drums 113.

The toner images on the photoconductor drums 113 are conveyed to the primary transfer position by the rotation of the photoconductor drum 113, and are primarily transferred onto the intermediate transfer belt 117 in order of, for example, Y, M, C, and K to form a full-color toner image on the intermediate transfer belt 117. Subsequently, the full-color toner image superimposed on the intermediate transfer belt 117 is secondarily transferred onto a sheet fed by the registration roller pair 108 at the secondary transfer position. The secondarily transferred image is then fixed by the fixing device 110. The sheet on which the toner image has been fixed by the fixing device 110 is discharged onto the output tray 111.

In the case of duplex printing, the sheet is conveyed to the duplex tray 112, and is conveyed to the registration roller pair 108. Further, the toner not having been transferred and remaining on the photoconductor drum 113 is removed by the cleaner 118. The above-described series of operations forms a full-color image on the sheet in the image forming apparatus 100.

Figure 2A:
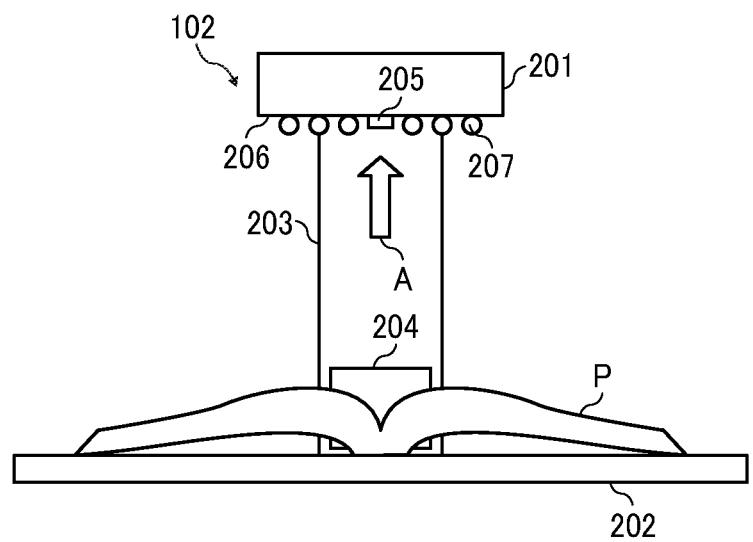
FIGS. 2A and 2B are illustrations of schematic configurations of the document scanner of FIG. 1 according to an embodiment of the present disclosure.
Figure 2B:
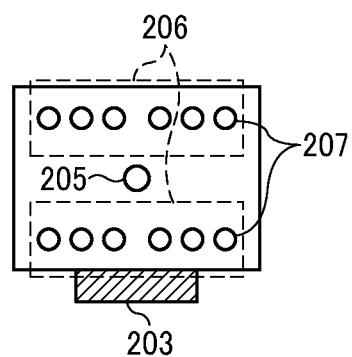

FIGS. 2A and 2B are illustrations of schematic configurations of the document scanner 102 according to an embodiment of the present disclosure. FIG. 2A is a front view of the document scanner 102.

FIG. 2B is a diagram of the document scanner 102 of which an illumination unit 206 is viewed in a direction indicated by arrow A in FIG. 2A. The document scanner 102 includes, for example, an imager 201 (image capture unit), a document table 202, a support unit 203, and an image display unit 204.

The support unit 203 is disposed on the back side in the document table 202 of the document scanner 102. The support unit 203 is disposed vertically with respect to the document table 202, and has the imager 201 on top. Further, the imager 201, projecting forward from the support unit 203, is positioned above the document table 202. The imager 201 includes, for example an area sensor 205 and the illumination unit 206 on the bottom surface facing the document table 202.

As described above, the imager 201 includes the area sensor 205 and the illumination unit 206. The area sensor 205 (image sensor) captures an image of the document P facing upward on the document table 202 from above the document table 202, and outputs image data as the capturing result to a control device 301 to be described later. The area sensor 205 employs, for example, a camera including a two-dimensional image sensor.

The illumination unit 206 illuminates the document P facing upward on the document table 202 with light from above the document table 202. In capturing an image of the document P by the area sensor 205, room illumination or shadow of the user might be reflected in image data. The illumination unit 206 is configured to illuminate the document P to prevent such phenomenon. The illumination unit 206 includes, for example, two sets of a plurality of light-emitting diodes (LEDs) 207 arranged in line. The two sets are parallel to each other in the longitudinal direction of the area sensor 205, and each set is disposed on each one side of the area sensor 205 in a direction perpendicular to the longitudinal direction. The illumination unit 206 is turned on or off according to an instruction from a user.

A document P to be scanned is placed on the document table 202 to allow a user to flip a page of the document P. The document table 202 has a surface on which the document P is to be placed. The surface of the document table 202 is, for example, black colored, and an imaging area to be imaged by the area sensor 205 is indicated with marks or white line.

The support unit 203 supports the area sensor 205 and the illumination unit 206. Additionally, the support unit 203 includes an image display unit 204 to display image data captured by the area sensor 205, at the base. Disposing the image display unit 204 at the base of the support unit 203 reduces the amount of movement of user's eyes between the document P and the image display unit 204. However, the image display unit 204 is disposed at any position of the support unit 203.

A description is given below of a procedure for scanning the document P in the document scanner 102. A user first places a document P on the document table 202 with a desired page open. The user inputs an instruction, for example, to perform scanning to the operation unit 105. In accordance with the instruction of the user input to the operation unit 105, the image forming apparatus 100 turns on the illumination unit 206 and causes the area sensor 205 to capture an image of the document P. Then, the user flips a page of the document P to a desired page. The same processes as described above are repeated. Thus, the area sensor 205 continuously captures an image of the document P. The document scanner 102 transfers image data captured by the area sensor 205 in accordance with the user's instruction in the operation unit 105, to the image forming unit 104 to output hard copy. Alternatively, the document scanner 102 outputs the image data to a storage device 302 such as a hard disk drive (HDD).

The document scanner 102 has a moving-image mode to capture a moving image and a still-image mode to capture a still image, using the area sensor 205, which is to be described in detail later. In the still-image mode, the area sensor 205 captures still-image data, which is to be output as hard copy from the image forming unit 104 or to be stored in the storage device 302. In the following description, the operation of capturing an image of the document P in the still-image mode performed by the area sensor 205 is expressed as "reading" or "scanning" operation. Further, a series of processes for scanning is expressed as scanning processing.

The vertical direction and the lateral direction of the image data captured by the area sensor 205 are a main scanning direction and sub-scanning direction, respectively. In other word, the main scanning direction is along a line connecting between the front and the back of a paper sheet (the document table 202) in the document scanner 102 in FIG. 2A. The sub-scanning direction is along a line connecting between right and left of a paper sheet (the document table 202) in the document scanner 102 in FIG. 2A.

In the image data captured by the area sensor 205, the front side of the surface of the paper placed on the document table 202 of the document scanner 102 in FIG. 2 is referred to as the lower side, and the back side of the surface of the paper is referred to as the upper side. Further, the right side of the surface of the paper is the right, and the left side of the surface of the paper is the left.

Figure 3:
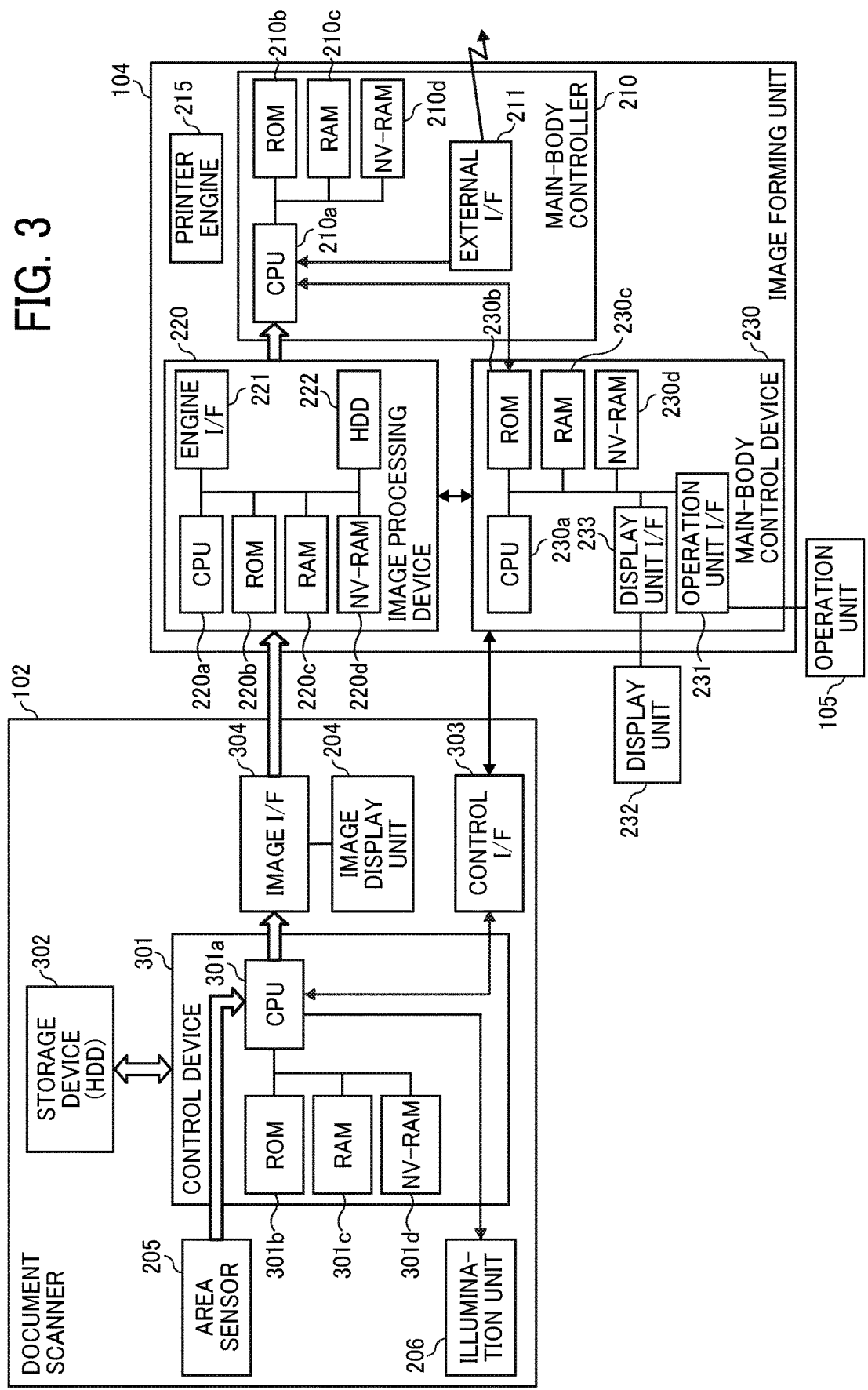
FIG. 3 is a block diagram of a hardware configuration of the image forming apparatus of FIG. 1 according to an embodiment of the present disclosure.

FIG. 3 is a block diagram of a hardware configuration of the image forming apparatus 100 according to an embodiment of the present disclosure. As described above, the image forming apparatus 100 includes the image forming unit 104 and the document scanner 102.

The document scanner 102 includes, for example, a control device 301, a storage device 302, a control interface (I/F) 303, an image I/F 304, an area sensor 205, and an illumination unit 206.

The control device 301 controls various devices, such as the area sensor 205 and the illumination unit 206 and performs image processing. The control device 301 includes a central processing unit (CPU) 301a, a read-only memory (ROM) 301b, a random access memory (RAM) 301c, a non-volatile (NV)-RAM 301d.

The ROM 301b stores program according to which the CPU 301a manages data and controls peripheral devices in the document scanner 102. The CPU 301a performs predetermined processes according to the program stored in the ROM 301b. The RAM 301c is a work memory used for the CPU 301a to perform processing. The RAM 301c is also used as, for example, a buffer to temporarily store data from the area sensor 205 and a memory to process data stored in the buffer. The NV-RAM 301d stores data that is desired to be retained in a power-off state.

The storage device 302 includes, for example, a high-capacity memory such as a hard disk drive (HDD) that stores a large amount of readable and writable data such as image data. The control I/F 303 is communicably connected to the main-body control device 230, and is an interface for transmitting and receiving information regarding the setting of the document scanner 102 and information regarding an instruction to execute or terminate a scanning operation of the document scanner 102, to and from the main-body control device 230. The image I/F 304 is communicably connected to an image processing device 220, and is an interface for transmitting and receiving image data captured by the document scanner 102, to and from the image processing device 220. The image I/F 304 also serves as an interface to the image display unit 204 disposed on the support unit 203, to display an image.

The image forming unit 104 includes a main-body controller 210, an image processing device 220, a main-body control device 230, and a printer engine 215. The printer engine 215 includes the image forming device 109, the registration roller pair 108, and the fixing device 110.

The main-body controller 210 controls the printer engine 215, the image processing device 220, and the main-body control device 230 to control the operation of the image forming apparatus 100 as a whole. The main-body controller 210 includes a CPU 210a, a ROM 210b, a RAM 210c, a NV-RAM. Each of these elements has the same function with a corresponding function in the control device 301. Therefore, the detailed description thereof is omitted. Note that in some embodiments, a desired section is replaced by an application specific integrated circuit (ASIC) as appropriate.

Additionally, the main body-controller 210 further includes an external I/F 211. The external I/F is an interface between the image forming apparatus 100 and the peripheral having a communication function connected with the image forming apparatus 100 via, for example, a local area network (LAN) and a wide area network (WAN) constituted by data transmission line with or without wires. In some embodiments, the external I/F 211 is an interface to a storage medium.

The image forming apparatus 100 external interface 603 further enables the image forming apparatus 22 to read or write data from or to the storage medium 603a. Examples of the recording medium include a flexible disc, a compact disc (CD), a digital versatile disc (DVD), a secure digital (SD) memory card, and a universal serial bus (USB) memory.

The image processing device 220 performs image processing on image data transmitted through the image I/F 304 or the external I/F 211 as appropriate, and controls the printer engine 215 to form an image of the image data on a sheet. The image processing device 220 includes a CPU 220a, a ROM 220b, a RAM 220c, and a NV-RAM 220d. Each of these elements has the same function a corresponding function in the control device 301. Therefore, the detailed description thereof is omitted. In some embodiments, the image processing device 220 employs an ASIC to replace a desired section.

The image processing device 220 further includes an engine I/F 221 connected with the CPU 220a via bus, and an HDD 222 as a storage device to store the information and a program for forming an image. The image processing device 220 transfers a signal to control the printer engine 215 to the printer engine 215 through the engine I/F 221 and receives information to form the image from the printer engine 215.

The main-body control device 230 controls the operation unit 105 and a display unit 232 as a user I/F connected with the image forming unit 104. The main-body control device 230 includes a CPU 230a, a ROM 230b, a RAM 230c, and a NV-RAM 230d. Each of these elements has the same function with a corresponding function in the control device 301. Therefore, the detailed description thereof is omitted. In some embodiments, the main-body control device 230 employs an ASIC to replace a desired section as appropriate.

The main-body control device 230 further includes a display I/F 233 and an operation unit I/F 231 connected with CPU 230a via bus. The image forming unit 104 is communicable with the display unit 232 via the display unit I/F 221, and with the operation unit 105 via the operation unit I/F 231.

The operation unit 105 serves to accept a user's instruction to execute or terminate scanning by the document scanner 102, and also accept a user's instruction to change various settings of the document scanner 102 and the image forming apparatus 100. The operation unit 105 is, for example, a key board, a mouse, or a touch panel. The display unit 232 serves to display the operating state of the image forming apparatus 100 for the user. The display unit 232 is, for example, a display or a touch panel.

Figure 4:
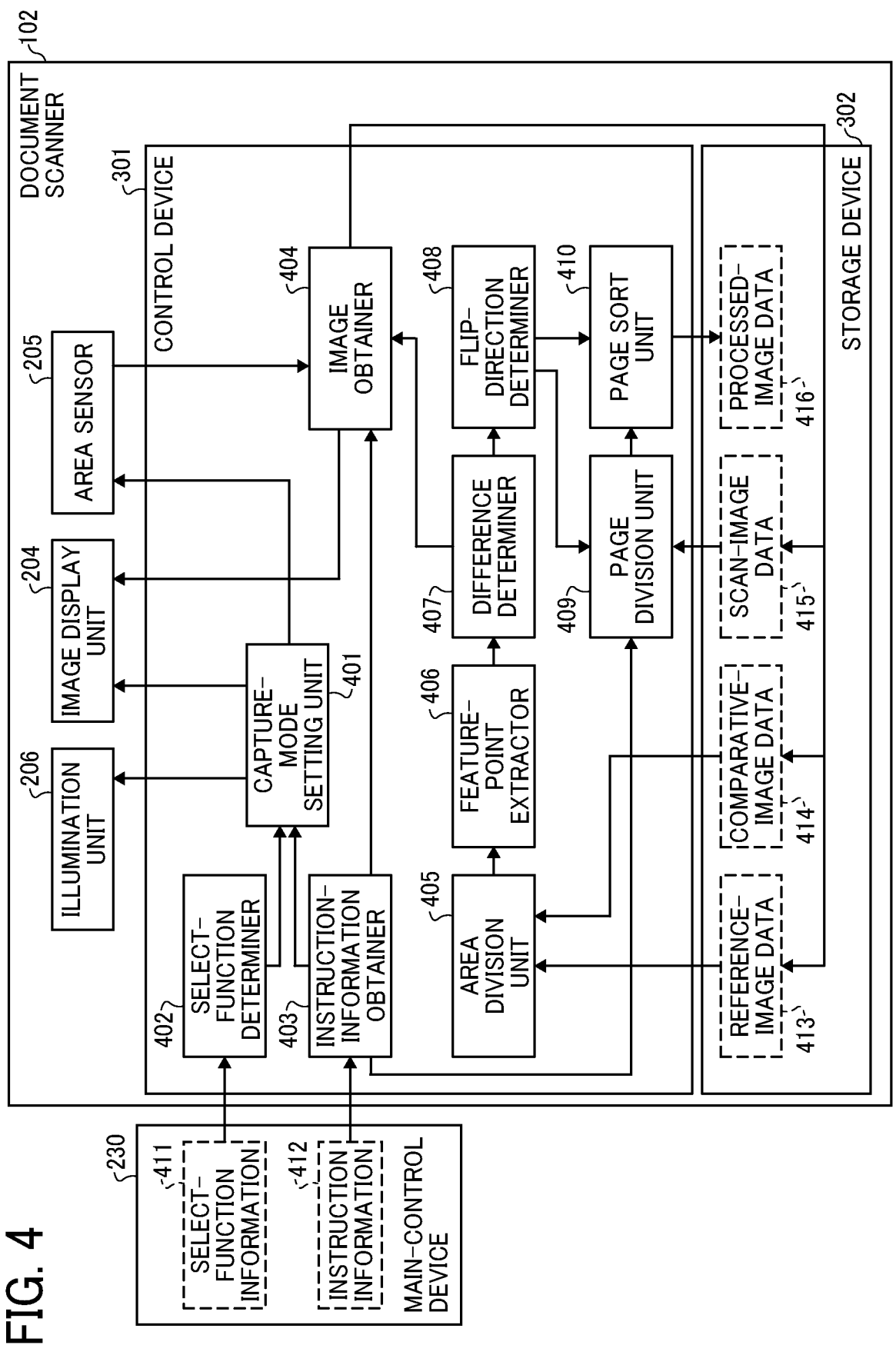
FIG. 4 is a block diagram of a functional configuration of the image forming apparatus of FIG. 1 according to an embodiment of the disclosure.

FIG. 4 is a block diagram of a functional configuration of the image forming apparatus 100 according to an embodiment of the disclosure. The document scanner 102 includes, for example, a capture-mode setting unit 401, a select-function determiner 402, an instruction-information obtainer 403, an image obtainer 404, an area division unit 405, a feature-point extractor 406, a difference determiner 407, a flip-direction determiner 408, a page division unit 409, and a page sort unit 410.

The capture-mode setting unit 401, the select-function determiner 402, the instruction-information obtainer 403, the image obtainer 404, the area division unit 405, the feature-point extractor 406, the difference determiner 407, the flip-direction determiner 408, the page division unit 409, and the page sort unit 410 are implemented by the CPU 301a, the ROM 301b, RAM 301c, and the NV-RAM 301d.

The capture-mode setting unit 401 sets the image-capturing mode of the document scanner 102 to any of the moving-image mode, the still-image mode, and the power-saving mode. In the moving-image mode set by the capture-mode setting unit 401, the area sensor 205 captures an image of the document P with a predetermined frequency with a resolution lower than that of the still-image mode, so as to obtain a movie image of the document P. In the still-image mode set by the capture-mode setting unit 401, the area sensor 205 captures a still image of the document P with a resolution higher than that of the moving-image mode.

In the power-saving mode set by the capture-mode setting unit 401, the area sensor 205 stops capturing an image, and the power supply to the area sensor 205 is turned off. Upon receiving an instruction to change the image-capturing mode from the select-function determiner 402 and the instruction-information obtainer 403, the capture-mode setting unit 401 sets the image-capturing mode of the area sensor 205 based on the received instruction.

In the still-image mode set by the capture-mode setting unit 401 in accordance with the received instruction, the capture-mode setting unit 401 sets the image-capturing mode to the moving-image mode in response to a completion of the still-image capturing operation performed by the area sensor 205.

In a case when a predetermined time period elapses after setting the image-capturing mode to the moving-image mode without receiving an instruction to change the image-capturing mode from the instruction-information obtainer 403, the capture-mode setting unit 401 may set the image-capturing mode to the power-saving mode.

The capture-mode setting unit 401 controls the area sensor 205, the illumination unit 206, and the image display unit 204. In the moving-image mode, the capture-mode setting unit 401 powers on the area sensor 205 and the image display unit 204 to cause the area sensor 205 to capture a moving image of the document P and cause the image display unit 204 to display the captured moving image.

In the still-image mode, the capture-mode setting unit 401 turns on the illumination unit 206 at a predetermined timing and causes the area sensor 205 to capture a still image of the document P, turning off the illumination unit 206 thereafter. In the power-saving mode, the capture-mode setting unit 401 powers off the area sensor 205 and the image display unit 204.

The select-function determiner 402 determines which has been selected by the user among executable functions provided by the image forming apparatus 100. The select-function determiner 402 obtains select-function information 411 from the main-body control device 230, and determines the function selected by the user based on the obtained select-function information 411.

The select-function information 411 represents which has been selected by the user among a copy function, a printing function, a fax function, a scanner function (first scanning function) performed by the scanner 101's scanning the document P, and a document-scanner function (second scanning function) performed by the document scanner 102's scanning the document P, which are provided by the image forming apparatus 100. The user operates the operation unit 105 to select a function to be executed by the image forming apparatus 100.

For example, the select-function determiner 402 determines that the user has selected the document-scanner function based on the received select-function information 411. In this case, the select-function determiner 402 issues the capture-mode setting unit 401 an instruction to set the moving-image mode. When determining that the user has selected a function other than the document-scanner function, the select-function determiner 402 issues the capture-mode setting unit 401 to set power-saving mode.

In some embodiments, the main-body control device 230 determines what the user has selected for a subsequent execution, instead. In this case, the select-function information 411 represents information regarding whether the document-scanner function has been selected or not by the user. Upon receiving the select-function information 411, the select-function determiner 402 determines that the user has set the document-scanner function.

The instruction-information obtainer 403 obtains instruction information 412, and controls the document scanner 102 based on the obtained instruction information 412. The instruction information 412 includes an instruction to perform scanning the document P in the area sensor 205 or an instruction to terminate scanning.

The main-body control device 230 outputs the instruction information 412 to the instruction-information obtainer 403 in accordance with the user's instruction to perform or terminate scanning input to the operation unit 105. When receiving the instruction to perform scanning, the instruction-information obtainer 403 issues the capture-mode setting unit 401 to set the still-image mode in the area sensor 205.

In addition, the instruction-information obtainer 403 informs the image obtainer 404 of the obtained instruction to perform scanning in response to the instruction to perform scanning. When receiving the instruction to terminate scanning, In some embodiments, the instruction-information obtainer 403 informs the page sort unit 410 that the scanning operation is completed. In addition, in some embodiments, the instruction-information obtainer 403 determines that the document scanner 102 is not used any longer, and issues the capture-mode setting unit 401 to set the power-saving mode, in response to the instruction to terminate scanning.

The image obtainer 404 obtains, from the area sensor 205, a plurality of image data at different timings. In the moving-image mode set by the capture-mode setting unit 401, the area sensor 205 starts capturing a moving image. In this case, the image obtainer 404 causes the image display unit 204 to display the moving-image data output from the area sensor 205. In some embodiments, the image obtainer 404 outputs the moving-image data to the storage device 302 to store the moving-image data therein.

In the still-image mode set by the capture-mode setting unit 401, the area sensor 205 starts capturing a still image. The image obtainer 404 stores still-image data as scan-image data 415 output from the area sensor 205, in the storage device 302. Note that the scan-image data 415 corresponds to read image data. In some embodiments, the image obtainer 404 causes the image display unit 204 to display the still-image data as a scan result.

The image obtainer 404 obtains reference-image data 413 and comparative-image data 414 as the plurality of image data. When the instruction-information obtainer 403 obtains the instruction to perform scanning, the image obtainer 404 obtains the reference image data 413 from the area sensor 205. The reference image data 413 is image data captured at a predetermined timing and extracted as the still-image data from the moving-image data captured by the area sensor 205 before start of scanning.

Note that the predetermined timing is set to a timing at which the instruction-information obtainer 403 obtains the instruction to perform scanning. However, no limitation is intended herein. That is, the image obtainer 404 obtains the reference-image data 413 at any timing before the user starts flipping a page of the document P. For example, the predetermined timing is a timing at which a predetermined time has passed after a timing at which the instruction-information obtainer 403 has obtained the instruction to perform scanning. Alternatively, in some embodiments, the image obtainer 404 reads out image data captured by the area sensor 205 a predetermined time before the instruction-information obtainer 403 obtains the instruction to perform scanning, as the reference-image data 413 from the storage device 302.

After the area sensor 205 has completed scanning, the image obtainer 404 obtains the comparative-image data 414. The comparative-image data 414 is image data captured at a predetermined timing and extracted as the still-image data from the moving-image data captured by the area sensor 205, after completion of scanning. Note that the predetermined timing is defined as a timing at which a predetermined time has passed after the start of the area sensor 205's scanning operation.

However, no limitation is intended herein. That is, the image obtainer 404 obtains the comparative-image data 414 at any timing between the time at which the user starts flipping a page of the document P and the time at which the user completes flipping the page.

Further, the image obtainer 404 obtains a new comparative-image data 414 based on an instruction output from the difference determiner 407. In this case, the image obtainer 404 deletes the comparative-image data 414 stored in the storage device 302, and newly stores the new comparative-image data 414 as image data in the storage device 302.

The image obtainer 404 collectively stores, in the storage device 302, a set of a plurality of still-image data obtained during the time period between the time at which the instruction-information obtainer 403 first receives the instruction to perform scanning and the time at which the instruction-information obtainer 403 receives the instruction to terminate scanning, as scan-image data 415. However, no limitation is intended herein. Thus, alternatively, in some embodiments, the plurality of pieces of still-image data is stored in the storage device 302 as individual pieces of scan-image data 415.

The area division unit 405 divides each of the reference-image data 413 and the comparative image data 414 into a plurality of image areas. More specifically, the area division unit 405 reads the reference-image data 413 and the comparative-image data 414 from the storage device 302, and divides each image data into a plurality of image areas. The area division unit 405 transmits the reference-image data 413 and the comparative-image data 414 each divided into a plurality of image areas, to the feature-point extractor 406.

The feature-point extractor 406 extracts a feature point for each image area. More specifically, the feature-point extractor 406 obtains the reference-image data 413 and the comparative-image data 414, each divided into a plurality of image areas by the area division unit 405, and extracts feature points for each image area of the obtained reference-image data 413 and the comparative-image data 414. The feature-point extractor 406 transfers the extracted feature points for each of the reference-image data 413 and the comparative-image data 414, to the difference determiner 407.

The difference determiner 407 determines the presence or absence of a difference between the reference-image data 413 and the comparative-image data 414. More specifically, the difference determiner 407 compares pixel values of the feature points at the same coordinate between the reference-image data 413 and the comparative-image data 414, and identifies an image area containing a feature point (for example, in the reference-image data 413) having a different pixel value from that of a corresponding feature point (for example, in the comparative-image data 414), based on the comparative result.

In this case, the difference determiner 407 compares the pixel values, such as red-green-blue (RGB) values or gray levels, for the feature points at the same coordinate between the reference-image data 414 and the comparative-image data 413, and sets a difference flag in image areas having a difference in pixel value. The difference determiner 407 transmits information regarding the image area given with the difference flag, to the flip-direction determiner 408. Note that when the difference determiner 407 determines the absence of any difference between the reference-image data 413 and the comparative-image data 414, the difference determiner 407 issues the image obtainer 404 an instruction to obtain a new comparative-image data 414.

The flip-direction determiner 408 identifies a direction in which the user flips a page of the document P scanned by the area sensor 205. More specifically, the flip-direction determiner 408 identifies a page flip direction, based on the image area containing the feature point having a difference in pixel value, which has been determined by the difference determiner 407 from among the plurality of image areas divided by the area division unit 405.

More specifically, the flip-direction determiner 408 identifies the direction in which the user flips pages of the document P, based on a direction in which the image area containing a feature point with a difference in pixel value is positioned relative to a determination reference position. Note that the determination reference position is the center of the reference-image data 413 or the comparative-image data 414. The flip-direction determiner 408 calculates the sum of the number of image areas set with difference flags for the right side of the determination reference position and the sum of the number of image areas set with difference flags for the left side of the determination reference position. When the sum of the number of image areas set with difference flags for the right side of the determination reference position is greater than the sum on the left side, the pages of the document P are flipped in the left direction. When the sum of the number of image areas set with difference flags for the left side of the determination reference point is greater than the sum on the right side, the pages of the document P are flipped in the right direction.

That is, when the difference determiner 407 has determined more differences on the left side relative to the determination reference position than the right side does, the flipping-direction determiner 408 determines that the pages are flipped in the right direction. When the difference determiner 407 has determined more differences on the right side relative to the determination reference position than the left side does, the flipping-direction determiner 408 determines that the pages are flipped in the left direction. Note that the flip-direction determiner 408 transmits information indicating the direction of flip to the page division unit 409 and the page sort unit 410.

Further, the flip-direction determiner 408 calculates the sum of the number of image areas set with difference flags regarding the upper side relative to the determination reference position and the sum of the number of image areas set with difference flags regarding the lower side relative to the determination reference position. When the sum of the number of image areas set with difference flags regarding the upper side relative to the determination reference position is greater than the sum on the lower side, the pages of the document P are flipped to the lower side. When the sum of the number of image areas given with difference flags on the lower side of the determination reference point is larger than the sum on the upper side, the pages of the document P are flipped to the upper side.

That is, when the difference determiner 407 has determined more differences on the lower side of the determination reference position than the upper side does, the flipping-direction determiner 408 determines that the pages are flipped upward. When the difference determiner 407 has determined more differences on the upper side of the determination reference position than the lower side does, the flipping-direction determiner 408 determines that the pages are flipped upward.

The page division unit 409 divides the scan-image data 415 into page units. That is, the page division unit 409 divides the scan-image data 415 in the center along the main scanning direction or the sub-scanning direction into two image data, thus generating two image data. Alternatively, in some embodiments, the page division unit 409 divides the scanned image data 415 in any one of the main scanning direction and the sub-scanning direction, which is preset by the user.

Alternatively, in some other embodiments, the page division unit 409 divides the scanned image data 415 in a direction determined based on information of the flip direction determined by the flip-direction determiner 408. More specifically, when the flip-direction determiner 408 determines that the flip direction is right or left, the page division unit 409 divides the scan-image data 415 into two, in the center along the main scanning direction. When the flip-direction determiner 408 determines that the flip direction is to the upper side or the lower side, the page division unit 409 divides the scan-image data 415 into two, in the center along the sub-scanning direction. The page division unit 409 transmits the divided image data to the page sort unit 410.

Alternatively, in some embodiments, the page division unit 409 determines the position to divide the image data into two pieces based on the scan-image data 415. For example, the document P of right and left facing pages is placed on the document table 202 such that the flip direction is parallel to the sub-scanning direction. When a tangent line is drawn to each of the upper side and the lower side of the document P, an inflection point occurs at the position at which the document is stapled.

Accordingly, the page division unit 409 determines the position of the inflection point for each of the upper-side edge and the lower-side edge of the document P extracted from the scan-image data 415, and divides the scan-image data 418 along the line connecting the determined reflection positions.

Considering the case in which the document P of right and left facing pages is placed on the document table 202 such that the flip direction is parallel with the main scanning direction, in some embodiments, the page division unit 409 determines a position of a reflection point for each of the upper and lower sides and the right and left sides of the document P and divides the scan-image data 415 along the line connecting the determined reflection points.

The page sort unit 410 sorts the pieces of image data divided by the page division unit 409 according to the flip direction determined by the flip-direction determiner 408. For example, when the flip-direction determiner 408 determines that the user flips the page of the document P to the left, the page sort unit 410 sorts the divided image data in order of the left-page image data and the right-page image data.

When the flip-direction determiner 408 determines that the user flips the page of the document P to the right, the page sort unit 410 sorts the divided image data in order of the right-page image data and the left-page image data. Note that the page sort unit 410 stores the sorted image data in the storage device 302 as processed image data 416.

When the flip-direction determiner 408 determines that the user flips the page of the document P to the upper side, the page sort unit 410 sorts the divided image data in order of the image data of upper-side page and the image data of the lower-side page. When the flip-direction determiner 408 determines that the user flips the page of the document P in downward, the page sort unit 410 sorts the divided image data in order of the lower-page image data and the upper-page image data.

FIGS. 5A and 5B are illustrations of examples of flipping a page of the document P. Hereinafter, it is assumed that a user flips the pages at a speed that does not damage the document P, for example, at approximately one second (sec) per page. In the moving-image mode, the area sensor 205 is capable of capturing an image for multiple times per second. For example, the area sensor 205 captures an image of the document P with a speed of 30 frames per second (fps), which is a frame rate of the area sensor 20. However, the frame rate of the area sensor 205 is not limited to such rate, and may be any predetermined frequency that is shorter than the time period from the time at which the user starts flipping a page of the document P to the time at which the user completes flipping the page, for example, at greater than or equal to 1 fps.

Various kinds of documents P are presumed as an object to be read by the top-shot scanner. When the object to be read is a book, the flip direction depends on the type of the book (document P). For example, when the document P is a foreign book, the user typically flips the pages to the left (i.e., in the direction from the right to the left). For another example, when the document P is a Japanese book, the user typically flips the pages to the right (i.e., in the direction from the left to the right).

Further, when the manuscript P is, for example, a report sheet, there are cases at which the user flips a page upward or downward. In the present disclosure, flipping a page to the upper side refers to flipping a page from the lower side to the upper side of the document P, and flipping a page to the lower side refers to flipping a page from the upper side to the lower side.

In scanning the document P of right and left facing pages or vertically facing pages by the top-shot scanner, the top-shot scanner sometimes divides the document P into page units, and stores the data in the storage device.

However, the direction of flip of pages changes with the type of the document P as described above. Accordingly, the direction of flip of pages is preliminarily determined, and which one of the facing pages to be stored as a leading page of the image data is determined, so as to sort the divided image data in numerical order of pages. Thus, in the case of left-flipping, the left page of the facing pages is stored as the leading page. In the case of right-flipping, the right page of the facing pages is stored as the leading page.

Figure 6:
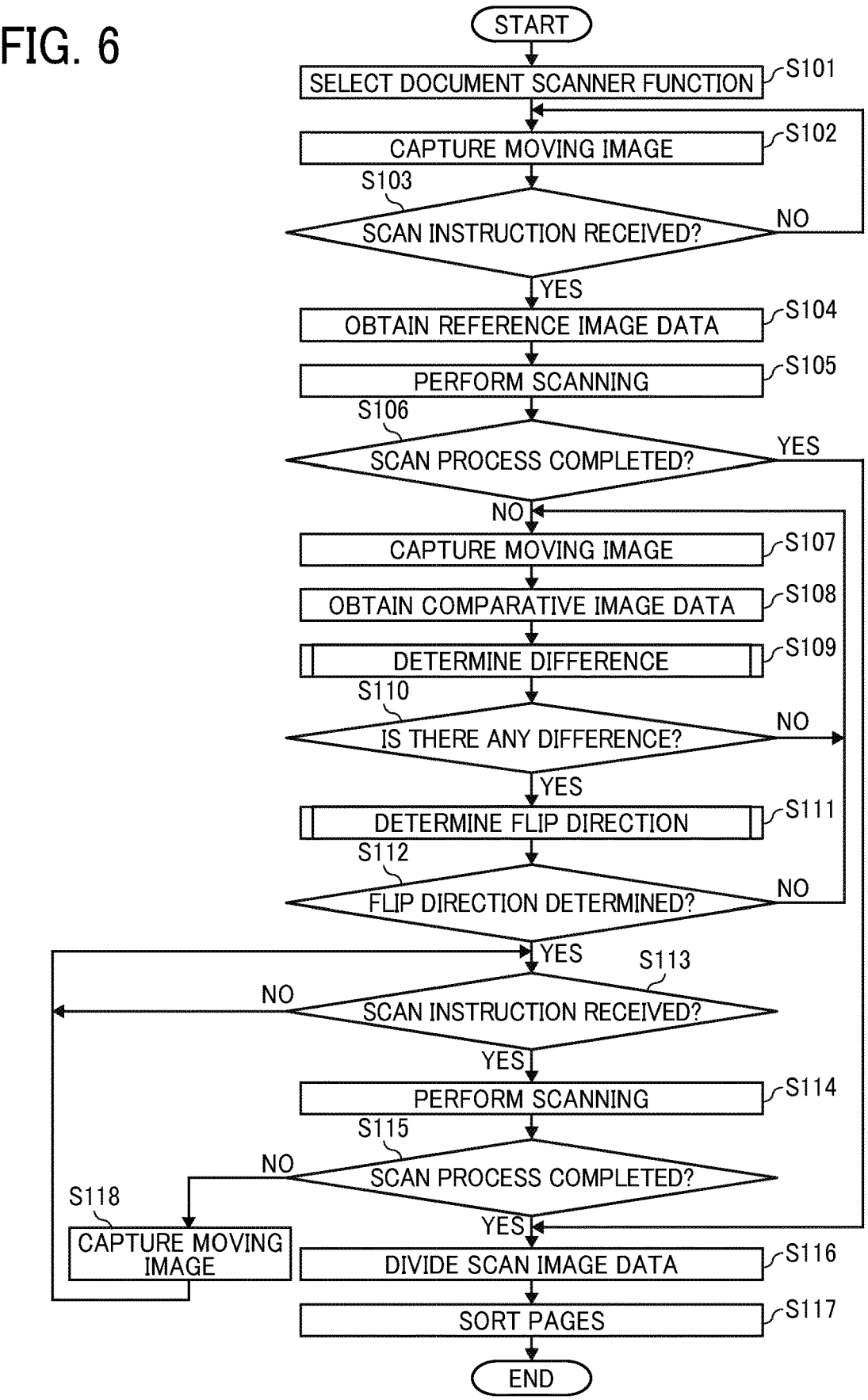
FIG. 6 is a flowchart of scan processing performed by the document scanner according to an embodiment of the present disclosure.

FIG. 6 is a flowchart of scan processing performed by the document scanner 102 as the image scanning device according to an embodiment of the present disclosure. The image scanning device starts the scan processing in FIG. 6, for example, when the image forming apparatus 100 is powered on, or returns to the standby mode.

In step S101, the image forming apparatus 100 selects the document-scanner function in response to an operation of the user input to the operation unit 105. More specifically, in accordance with the select-function information 411 transmitted from the main-body control device 230, the select-function determiner 402 determines whether the user has selected the document scanner function, in the document scanner 102. Note that when the document-scanner function is already set, step S101 is omitted.

In step S102, the area sensor 205 of the document scanner 102 captures a moving image of the document P. Specifically, in accordance with the moving-image mode set by the capture-mode setting unit 401, the area sensor 205 starts capturing a moving image of the document P. In some embodiments, the document scanner 102 displays the moving-image data captured by the area sensor 205 on the image display unit 204 during the capturing operation of the area sensor 205. However, when the area sensor 205 is already set to the moving-image mode, the operation of setting the area sensor 205 to the moving-image mode by the capture-mode setting unit 401 is omitted.

In step S103, the document scanner 102 waits until the user inputs an instruction to perform scanning. The main-body control device 230 outputs instruction information 412 indicating the instruction to perform scanning to the instruction-information obtainer 403 in accordance with the operation of the user input to the operation unit 105. When the instruction-information obtainer 403 obtains the instruction information 412 (Yes in step S103), the process proceeds to step S104. When the instruction-information obtainer 403 fails to obtain the instruction information 412 indicating the instruction to perform scanning, the process reruns to step S102.

In step S104, the image obtainer 404 obtains the reference image data 413. The image obtainer 404 extracts, as still-image data, image data captured by the area sensor 205 at a predetermined timing from the moving-image data captured by the area sensor 205, and stores the extracted image data in the storage device 302 as first image data 413.

In step S105, the document scanner 102 scans the document P. At this time, the capture-mode setting unit 401 sets the area sensor 205 to the still-image mode, and the area sensor 205 captures a still image of the document P accordingly. Further, the image obtainer 404 stores the captured still-image data in the storage device 302 as scan-image data 415. In some embodiments, the image obtainer 404 displays the captured still-image data on the image display unit 204 as a scan result.

In step S106, the document scanner 102 determines whether the process of scanning the document P is completed. When the user operates the operation unit 105 to issue an instruction to terminate scanning, the instruction-information obtainer 403 obtains the instruction information 412 indicating the instruction to terminate scanning from the main-body control device 230 (Yes in step S106). As a result, the document scanner 102 proceeds to step S115. With no instruction to terminate scanning issued, i.e., when the instruction-information obtainer 403 fails to obtain such an instruction to terminate scanning (No in step S106), the process proceeds to step S107.

In step S107, the area sensor 205 captures a moving image of the document P. Specifically, in accordance with the moving-image mode set by the capture-mode setting unit 401, the area sensor 205 starts capturing a moving image of the document P. In some embodiments, the document scanner 102 displays the moving-image data captured by the area sensor 205 on the image display unit 204 during the capturing operation of the area sensor 205. However, when the area sensor 205 is already set to the moving-image mode, the operation of setting the area sensor 205 to the moving-image mode by the capture-mode setting unit 401 is omitted.

In step S108, the image obtainer 404 obtains comparative-image data 413. The image obtainer 404 extracts, as still-image data, image data captured by the area sensor 205 at a predetermined timing from the moving-image data captured by the area sensor 205, and stores the extracted image data in the storage device 302 as second image data.

In step S109, the difference determiner 407 compares between the reference-image data 413 and the comparative-image data 414 to determine the presence or absence of a difference between the reference-image data 41 and the comparative-image data 414.

A detailed description is given later of the process in step S109.

When the difference determiner 407 determines the presence of a difference between the reference-image data 41 and the comparative-image data 414 (Yes in step S110), the process proceeds to step S111. When the difference determiner 407 determines the absence of a difference between the reference-image data 41 and the comparative-image data 414 (No in step S110), the process proceeds to step S107.

In some embodiments, the document scanner 102 waits for the user to complete flipping pages, i.e., until a predetermined time period passes, before starting step S107.

In step S111, the flip-direction determiner 408 identifies a direction of flip of pages, based on the difference between the reference-image data 413 and the comparative-image data 414. A detailed description of the process in step S111 is to be given later.

When the flip-direction determiner 408 has determined a direction of flip of pages (Yes in step S112), the process proceeds to step S113. However, when the flip-direction determiner 408 fails to determine a direction of flip of pages (No in step S112), i.e., the flip-direction determiner 408 has determined that the flip direction is indefinite, the process returns to step S107.

In step S113, the document scanner 102 waits until the user inputs an instruction to perform scanning. The main-body control device 230 outputs instruction information 412 indicating the instruction to perform scanning to the instruction-information obtainer 403 in accordance with the operation of the user input to the operation unit 105. When the instruction-information obtainer 403 obtains the instruction information 412 (Yes in step S113), the process proceeds to step S114. When the instruction-information obtainer 403 fails to obtain the instruction information 412 indicating the instruction to perform scanning, the process proceeds to step S118.

In step S114, the document scanner 102 scans the document P. At this time, the capture-mode setting unit 401 sets the area sensor 205 to the still-image mode, and the area sensor 205 captures a still image of the document P accordingly. Further, the image obtainer 404 stores the captured still-image data in the storage device 302 as scan-image data 415.

In some embodiments, the image obtainer 404 displays the captured still-image data on the image display unit 204 as a scan result.

In step S115, the document scanner 102 determines whether the process of scanning the document P is completed. When the user operates the operation unit 105 to issue an instruction to terminate scanning, the instruction-information obtainer 403 obtains the instruction information 412 indicating the instruction to terminate scanning from the main-body control device 230 (Yes in step S115). As a result, the document scanner 102 proceeds to step S116. With no instruction to terminate scanning issued, i.e., when the instruction-information obtainer 403 fails to obtain such an instruction to terminate scanning (No in step S118), the process proceeds to step S118.

In step S116, the page division unit 409 divides the scan-image data 415 into page units. Specifically, the page division unit 409 reads the scan-image data 415 obtained in step S114 from the storage device 302, and divides the read image data into page units.

In step S117, the page sort unit 410 sorts the pieces of image data divided by the page division unit 409 in step S116, based on the flip direction determined by the flip-direction determiner 408 in step S111.

Note that the page sort unit 410 stores the sorted image data in the storage device 302 as processed image data 416. Note that, when the processes in step S107 through S115 are not performed, the flip-direction determiner 408 fails to determine the direction of flip of pages of the documents P. Accordingly, in some embodiments, the page sort unit 410 sorts the divided image data based on the flip direction preliminarily stored by the document scanner 102.

In step S118. the area sensor 205 captures a moving image of the document P. Specifically, in accordance with the moving-image mode set by the capture-mode setting unit 401, the area sensor 205 starts capturing a moving image of the document P. In some embodiments, the document scanner 102 displays the moving-image data captured by the area sensor 205 on the image display unit 204 during the capturing operation of the area sensor 205. However, when the area sensor 205 is already set to the moving-image mode, the operation of setting the area sensor 205 to the moving-image mode by the capture-mode setting unit 401 is omitted.

Figure 7:
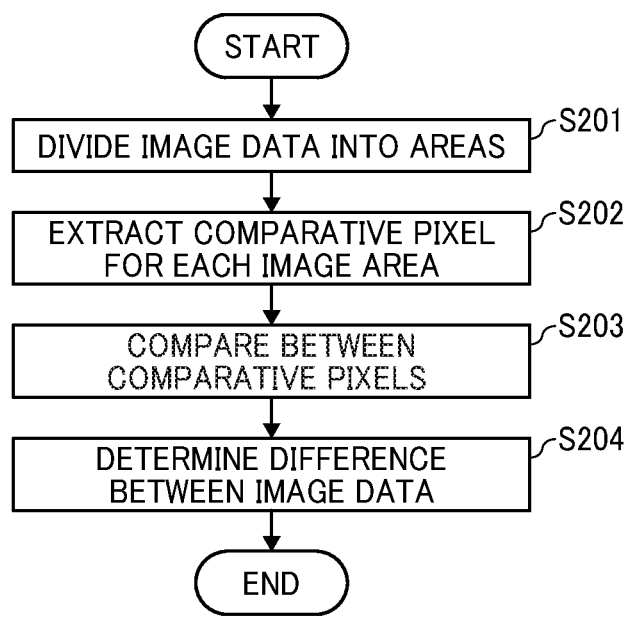
FIG. 7 is a flowchart of a difference determining process performed by a difference determiner according to an embodiment of the present disclosure

FIG. 7 is a flowchart of the difference determining process performed by the difference determiner 407 according to an embodiment of the present disclosure. Note that the difference determining process in FIG. 7 provides a detailed description of the process in step S109 of FIG. 6.

In step S201, the area division unit 405 divides each of the reference-image data 413 and the comparative image data 414 into a plurality of image areas. More specifically, the area division unit 405 reads the reference-image data 413 and the comparative-image data 414 from the storage device 302, and divides each image data into a plurality of image areas. A detailed description is given later of the process in step S201.

In step S202, the feature-point extractor 406 extracts a feature point for each of the plurality of image areas.

More specifically, the feature-point extractor 406 extracts a feature point for each image area of the reference-image data 413 and the comparative-image data 414 divided by the area division unit 405 in step S201.

A detailed description of the process in step S202 is to be given later.

In step S203, the difference determiner 407 compares feature points between the reference-image data 413 and the comparative-image data 414, for each image area. More specifically, the difference determiner 407 compares a feature point of each image area of the reference-image data 413, with a feature point of each image area at of the comparative image data 414. In this case, the compared image areas of the reference-image data 413 and the comparative-image data 414 are at corresponding position.

In this case, the difference determiner 407 compares the pixel values, such as red-green-blue (RGB) values or gray levels, for the feature points at the corresponding position between the reference-image data 414 and the comparative-image data 413, and sets a difference flag in image areas having a difference in pixel value.

A detailed description of the process in step S203 is to be given later.

In step S204, the difference determiner 407 determines the presence or absence of a difference between the reference-image data 414 and the comparative-image data 413.

More specifically, the difference determiner 407 checks the presence or absence of the difference flag in each image area. When the difference determiner 407 has found the presence of the difference flag in any of the image areas, the difference determiner 407 determines the presence of the difference between the reference-image data 414 and the comparative-image data 413.

When the difference determiner 407 has not found any presence of the difference flag in all of the image areas, the difference determiner 407 determines the absence of the difference between the reference-image data 414 and the comparative-image data 413.

Figure 8B:
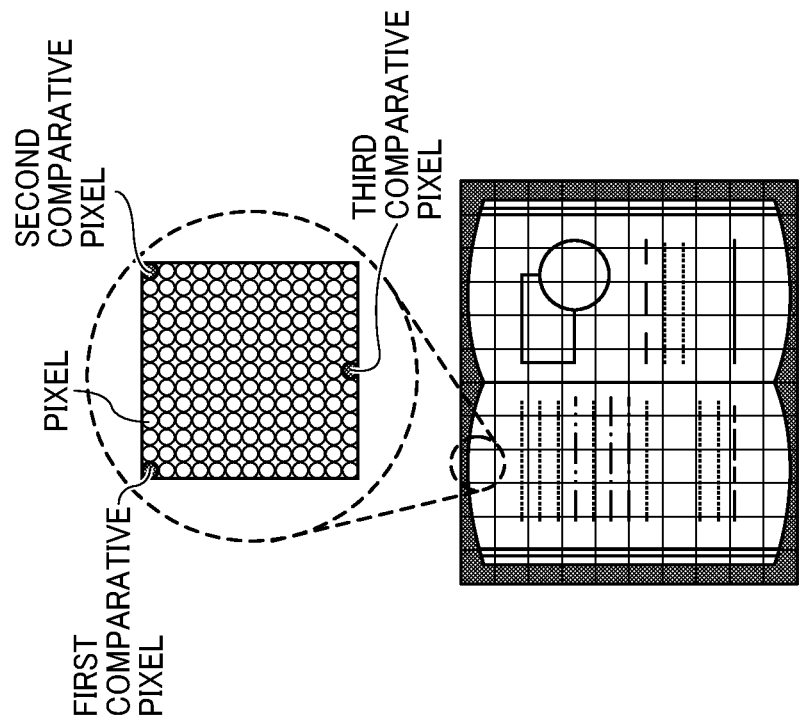
FIGS. 8A and 8B are illustrations of an area dividing method and a feature-point extracting method, which are performed by an area division unit and a feature-point extractor, respectively, according to an embodiment of the present disclosure.
Figure 8A:
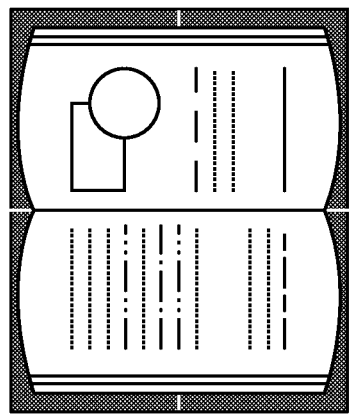

FIGS. 8A and 8B are illustrations of an area dividing method and a feature-point extracting method, which are performed by the area division unit 405 and the feature-point extractor 406, respectively, according to an embodiment of the present disclosure. FIG. 8A is an illustration of an example of the reference-image data 413, and FIG. 8B is an illustration of an example of the reference-image data 413 divided into a plurality of areas.

The following description describes the process performed by the area division unit 405 in step S202 and the process performed by the feature-point extractor 406 in step S202 in FIG. 7.

The area division unit 405 divides the reference-image data 413 into a plurality of areas. More specifically, the area division unit 405 divides the reference-image data 413 into, for example, ten areas in the main scanning direction and twelve areas in the sub-scanning direction. Thus, the area division unit 405 divides the reference-image data 413 into 120 image areas. Note that the number of divided areas in the main scanning direction and the sub-scanning direction is not limited to the above values, and is set to an arbitrary value.

Each image area of the reference-image data 413 consists of a plurality of pixels each having a pixel value such as a RGB value and gradation. For example, one image area consists of 13 pixels in the main scanning direction and 13 pixels in the sub-scanning direction, i.e., 169 pixels in total.

The feature-point extractor 406 extracts a feature point for each image area of the reference-image data 413. The following describes a case in which three pixels are extracted as the feature point for each image area. The feature-point extractor 406 selects, as a first feature point and a second feature point, two pixels at two corners next to each other out of four corners of an image area, from the pixels constituting the image area. The feature-point extractor 406 further extracts, as a third feature point, a pixel in the middle of a side facing a side connecting between the pixels selected as the first feature point and the second feature point.

This configuration enables extracting pixel values of pixels furthest from each other within the image area, thereby facilitating determination of a difference between the reference-image data 413 and the comparative-image data 414.

Note that, with an increase in number of feature points to be extracted, a load on a CPU and a memory increases. Accordingly, although the case in which three pixels are extracted as the feature point by the feature-point extractor 406 is described above, no limitation is intended thereby. However, as the number of feature points increases, the accuracy of determination of the difference between the reference-image data 413 and the comparative-image data 414 increases. Accordingly, in some embodiments, the feature-point extractor 406 extracts more feature points from each image area.

In the above-described case, the reference-image data 413 is divided into a plurality of areas by the area division unit 405 to extract feature points. However, no limitation is intended therein. In some embodiments, the same method applies to the comparative-image data 414 using the area division unit 405 and the feature-point extractor 406.

Figure 9A:
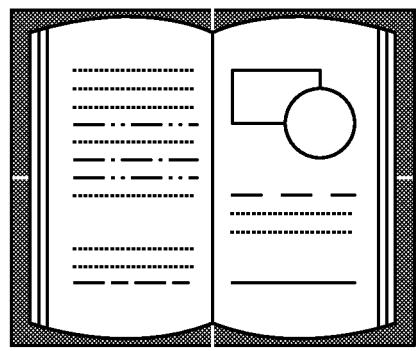
FIGS. 9A, 9B, and 9C are illustrations of a method of determining a difference performed by the difference determiner according to an embodiment of the present disclosure.
Figure 9B:
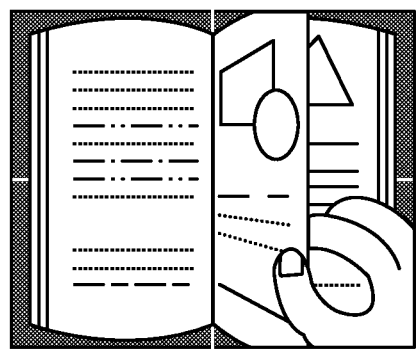
Figure 9C:
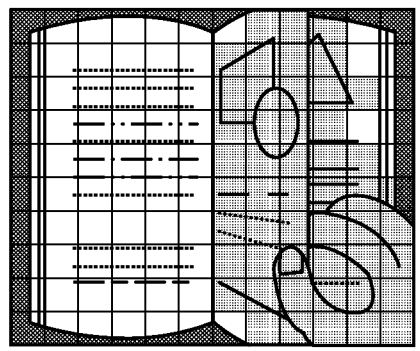

FIGS. 9A, 9B, and 9C are illustrations of a method of determining a difference performed by the difference determiner 407 according to an embodiment of the present disclosure. FIG. 9A is an illustration of an example of the reference-image data 413, FIG. 9B is an illustration of an example of the comparative-image data 414, and FIG. 9C is an illustration of a determination result of the difference between the reference-image data 413 in FIG. 9A and the comparative-image data in FIG. 9B.

The following describes the process performed by the difference determiner 407 in step S203 in FIG. 7.

As illustrated in FIG. 9B, image data to be captured by the area sensor 205 changes with the user' flip of pages of the document P. With such a change in image data to be captured by the area sensor 205, there is a change between the feature points of each image area of the reference-image data 413 and the feature points of each image area of the comparative-image data 414. The difference determiner 407 compares the feature points of the reference-image data 413, with the feature points of the reference-image data 414 at the position corresponding to the feature of points of the reference-image data 413, to identify an image area in which there has been any change between the reference-image data 413 and the comparative-image data 414.

In the following description, the case in which the difference determiner 407 compares RGB values of the feature points is described as an example. Note that the RBG value is expressed as (R, G, B). Further, the symbol "R" denotes the value of the R (red) component, the symbol "G" denotes the value of the G (green) component, and the symbol "B" denotes the value of the B (blue) component.

In a certain image area of the reference-image data 413, the RGB value of a first feature point is (120, 100, 20), and the RGB value of a first feature point at a corresponding position in the comparative-image data 414 is (80, 60, 40). In this case, the following calculated differences between the first feature points are obtained: the difference of the R component is 40 obtained by subtracting 80 from 120 (120−80=40); the difference of the G component is 40 obtained by subtracting 60 from (100−60=40); and the difference of the B component is −20 obtained by subtracting 40 from 20 (20−40=−20).

When there is no change between the reference-image data 413 and the comparative-image data 414, the difference therebetween is 0. Accordingly, in the above-described case, the difference determiner 407 determines the presence of the difference between the image areas. That is, when the difference is 0, the difference determiner 407 determines the absence of the difference between the image areas, and when the difference is not 0, the difference determiner 407 determines the presence of the difference between the image areas.

Note that the same applies to the second feature point and the third feature point to obtain differences. At this time, when the difference is not 0 for all of the first feature point, the second feature point, and the third feature point, the difference determiner 407 determines the presence of any difference between image areas.

In some case, when the difference is not 0 for all of the R component, the G component, and the B component, the difference determiner 407 determines the presence of any difference between image areas.

In some other cases, when the difference is not 0 for at least any of the R component, the G component, and the B component, the difference determiner 407 determines the presence of any difference between image areas.

Further, in some cases, there might be a change in RGB value due to the ambient brightness of the image forming apparatus 100, the state of the illumination unit 206, and the shadow of the user.

In view of such circumstances, in some embodiments, when the absolute value of the difference is smaller than a predetermined value, the difference determiner 407 determines the absence of difference between image areas. When the absolute value of the difference is greater than or equal to the predetermined value, the difference determiner 407 determines the presence of difference between image areas.

Subsequently, the difference determiner 407 sets a difference flag in an image area determined that the difference is present.

More specifically, the difference determiner 407 provides "1" to the image area determined that the difference is present, and "0" to the image area determined that the difference is absent. Thus, the difference determiner 407 stores such difference flags in association with the positions of the image areas, in the storage device 302. In FIG. 9C, the difference determiner 407 has determined the presence of differences between image areas, and the image areas provided with the difference flags are shaded.

Figure 10:
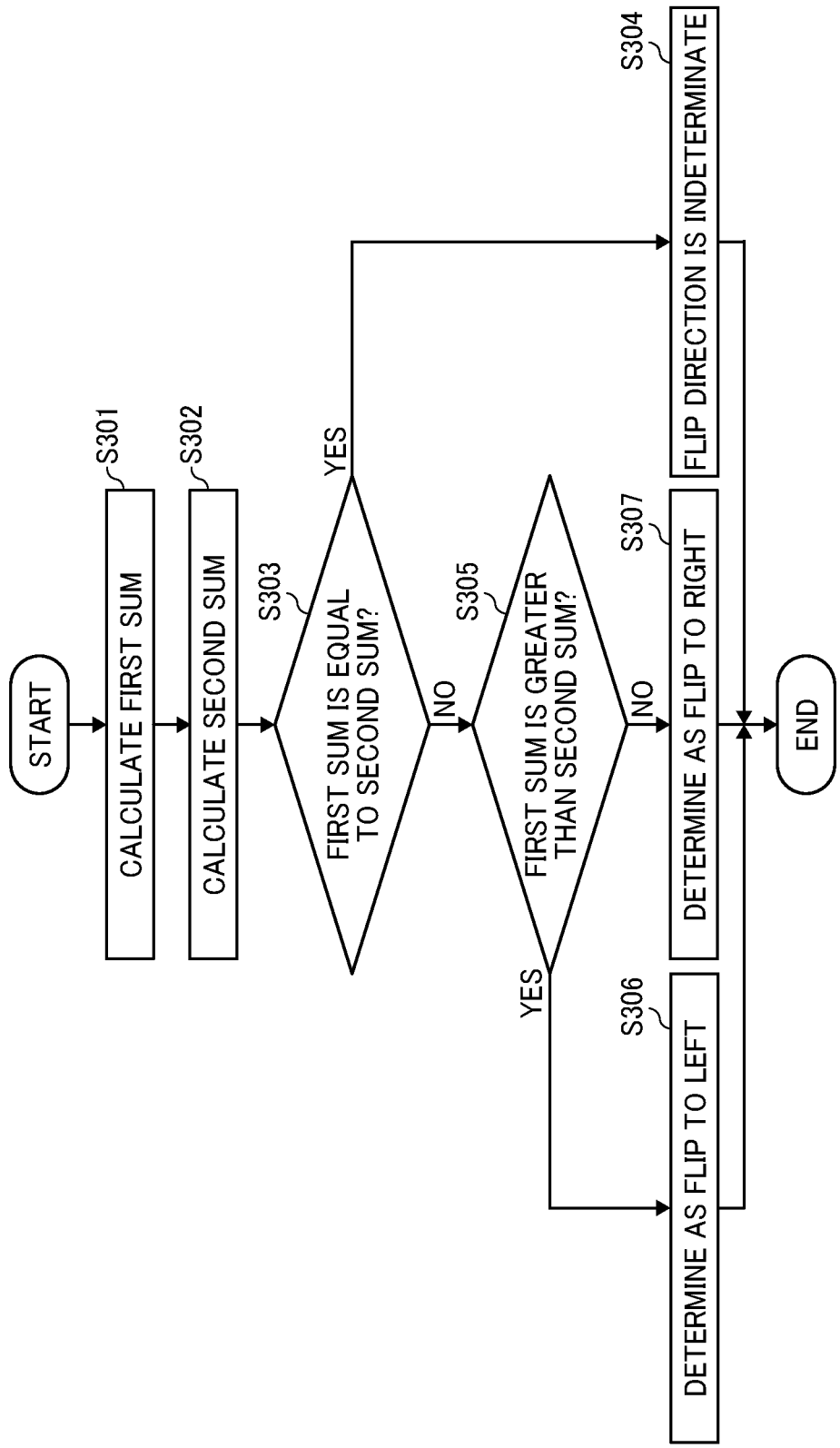
FIG. 10 is a flowchart of an example of a process performed by a flip-direction determiner according to an embodiment of the present disclosure.

FIG. 10 is a flowchart of an example of the process performed by the flip-direction determiner 408 according to an embodiment of the present disclosure.

Note that the process in FIG. 10 provides a detailed description of the process in step S111 of FIG. 6.

In step S301, the flip-direction determiner 408 sums up the number of image areas in which the difference flag related to the right side relative to the determination reference position is set. More specifically, the flip-direction determiner 408 sums up the number of difference flags stored in association with the image areas on the right side relative to the determination reference position, so as to obtain a first total value.

In the present disclosure, the first total value refers to the sum of the number of image areas set with the difference flags indicating the right side relative to the determination reference position. A detailed description is given later of the process in step S301.

In step S302, the flip-direction determiner 408 sums up the number of image areas in which the difference flag related to the left side relative to the determination reference position is set. More specifically, the flip-direction determiner 408 sums up the number of difference flags stored in association with the image areas on the left side relative to the determination reference position, so as to obtain a second total value.

In the present disclosure, the second total value refers to the sum of the number of image areas set with the difference flags indicating the left side relative to the determination reference position. A detailed description is given later of the process in step S302.

In step S303, the flip-direction determiner 408 compares the first total value obtained in step S301 with the second total value obtained in step S302. When the first total value is equal to the second total value, the process proceeds to step S304. When the first total value is not equal to the second total value, the process proceeds to step S305.

In step S304, the flip-direction determiner 408 fails to determine the direction of flip of pages of the document P being scanned by the document scanner 102. Thus, the flip-direction determiner 408 determines that the flip direction is indefinite in step S304.

In step S303, the flip-direction determiner 408 compares the first total value obtained in step S301 with the second total value obtained in step S302, to determine which total value is greater. When the first total value is greater than the second total value (Yes in step S305), the process proceeds to step S306. When the second total value is greater than the first total value (No in step S305), the process proceeds to step S307.

In step S306, the flip-direction determiner 408 determines that the pages of the document P, which is being scanned by the document scanner 102, are flipped to left.

In step S307, the flip-direction determiner 408 determines that the pages of the document P, which is being scanned by the document scanner 102, are flipped to right.

Figure 11A:
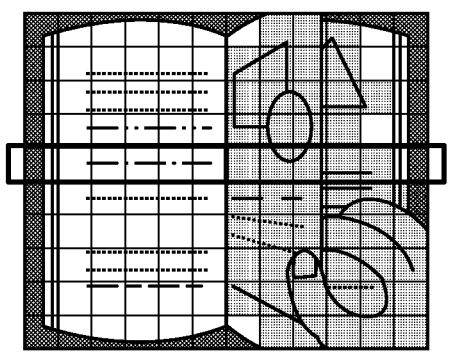
FIGS. 11A and 11B are illustrations of a method of determining a flip direction performed by the flip-direction determiner according to an embodiment of the present disclosure.
Figure 11B:
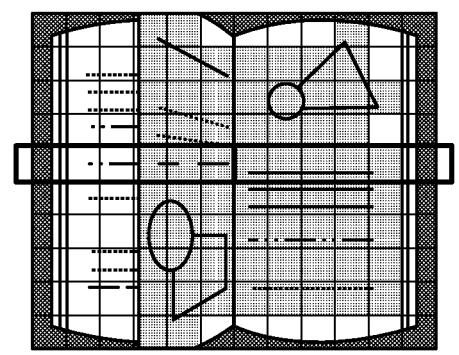

FIGS. 11A and 11B are illustrations of a method of determining a flip direction performed by the flip-direction determiner 408 according to an embodiment of the present disclosure. FIG. 11A is an illustration of the case in which the user moves a page for a short distance to flip the page, and FIG. 11B is an illustration of the case in which the user moves a page for a long distance to flip the page, compared to the case in FIG. 11A.

In FIGS. 11A and 11B, the page of the document P is assumed to be flipped to left by the user. The following describes the processes in step S301 through step S307 performed by flip-direction determiner 408.

In scanning the document P with the document scanner 102, the user flips a page of the document P to the next after completion of a scan of the first facing pages, so as to scan the next facing pages. In this case, when the flip direction is right to left, the pages of the document P are flipped to left.

Accordingly, when the document P of right and left facing pages is placed on the document table 202 such that the user flips pages in a direction parallel to the sub-scanning direction, there is a more significant change in the image data at the right side relative to the determination reference position of the image data captured by the area sensor 205, than the image data at the left side does. In contrast, when the flip direction is in the right direction, the pages of the document P are flipped from left to right.

Accordingly, there is a more significant change in the image data at the left side relative to the determination reference position of the image data captured by the area sensor 205, than the image data at the right side does.

The flip-direction determiner 408 determines which has more significantly changed between the image area at the right side and the image area at the left side relative to the determination reference position of the image data captured by the image sensor 205, and identifies a flip direction based on the direction in which more differences are present relative to the determination reference position. The flip-direction determiner 408 calculates the sum of the number of image areas set with difference flags for the right side of the determination reference position to obtain a first total value.

The flip-direction determiner 408 also calculates the sum of the number of image areas set with difference flags for the left side of the determination reference position to obtain a second total value. When the first total value is greater than the second total value, the flip-direction determiner 408 determines that the pages of the document P are flipped in the left direction. When the second total value is greater than the first total value, the flip-direction determiner 408 determines that the pages of the document P are flipped in the right direction.

More specifically, the flip-direction determiner 408 obtains the first total value by figuring up the number of image areas set with difference flags within a first range, and obtains the second total value by figuring up the number of image areas set with difference flags within a second range.

More specifically, when the area division unit 405 divides each of the reference image data 413 and the comparative image data 414 into 120 image areas consisting of 10 areas in the main scanning direction and 12 areas in the sub-scanning direction, the first range includes first to sixth image areas from the right in the fifth line from the top, and the second range includes first to sixth image areas from the left in the fifth line from the top.

However, the first range and the second range are not limited to such ranges. Thus, in some embodiments, the first range includes any image area for the right side relative to the determination reference position. Further, in some embodiments, the second range includes any image area for the left side relative to the determination reference position.

In some cases, the user's finger or arm might be reflected in the reference-image data 413 or the comparative-image data 414. To exclude any image area in which the user's finger or arm might be reflected, the first range and the second range are set to include any image area for the upper side relative to the determination reference point.

Note that the image obtainer 404 obtains, as comparative-image data 414, image data captured by the area sensor 205 at a predetermined timing after completion of a scan of the first facing pages. Accordingly, when the user slowly turns a page of the document P after completion of a scan of the first facing pages, the user moves the page for a short distance during the time period from the time at which the scanning is completed to the time at which the comparative-image data 414 is obtained.

In contrast, when the user quickly turns (flips) a page of the document P after completion of a scan of the first facing pages, the user moves the page for a long distance during the time period from the time at which the scanning is completed to the time at which the comparative-image data 414 is obtained.

In the case of FIG. 11A in which the user moves the page for a short distance to flip the page, the difference determiner 407 determines the presence of the difference between the reference-image data 413 and the comparative-image data 414 only in the image area on the right side relative to the determination reference position.

Specifically, in the case of FIG. 11A, the flip-direction determiner 408 obtains a value of 5 for the first total of the first range and a value of 0 for the second total value of the second range. Thus, the first total value is greater than the second total value.

That is, the difference determination unit 407 determines the presence of more differences between the reference-image data 413 and the comparative-image data 414 in the image areas on the right side relative to the determination reference position, than the left side does. As a result, the flip-direction determiner 408 determines that the direction of flipping a page of the document P is from right to left.

In the case of FIG. 11B in which the user moves the page for a long distance to flip the page, the difference determiner 407 determines the presence of the difference between the reference-image data 413 and the comparative-image data 414 in image areas on both sides (the right and left sides) of the determination reference position.

However, in this case, more image areas set with difference flags are present at the right side of the determination reference position than the left side does.

Specifically, in the case of FIG. 11B, the flip-direction determiner 408 obtains a value of 5 for the first total of the first range and a value of 3 for the second total value of the second range. Thus, the first total value is greater than the second total value. That is, the difference determination unit 407 determines the presence of more differences between the reference-image data 413 and the comparative-image data 414 in the image areas on the right side relative to the determination reference position, than the left side does.

As a result, the flip-direction determiner 408 determines that the direction of flipping a page of the document P is from right to left.

In FIGS. 11A and 11B, the cases in which the pages of the document P are flipped to left are described. However, no limitation is intended thereby. Thus, in some embodiments, the pages of the document P are flipped to right, and the flip-direction determiner 408 identifies the flip direction in the same manner as in the case of FIGS. 11A and 11B.

In the above-described embodiments, the case in which the document P of right and left facing pages is placed on the document table 202 so that the flip direction is parallel to the sub-scanning direction is described. However, in some embodiments, the document P of right and left facing pages is placed on the document table 202 such that the flip direction is parallel to the main scanning direction. In some other embodiments, the document P of vertically-facing pages is placed on the document table 202.

The following describes processing performed by the flip-direction determiner 408 according to another embodiment of the present disclosure, which also enables determining the flip direction accurately in such cases.

Figure 12:
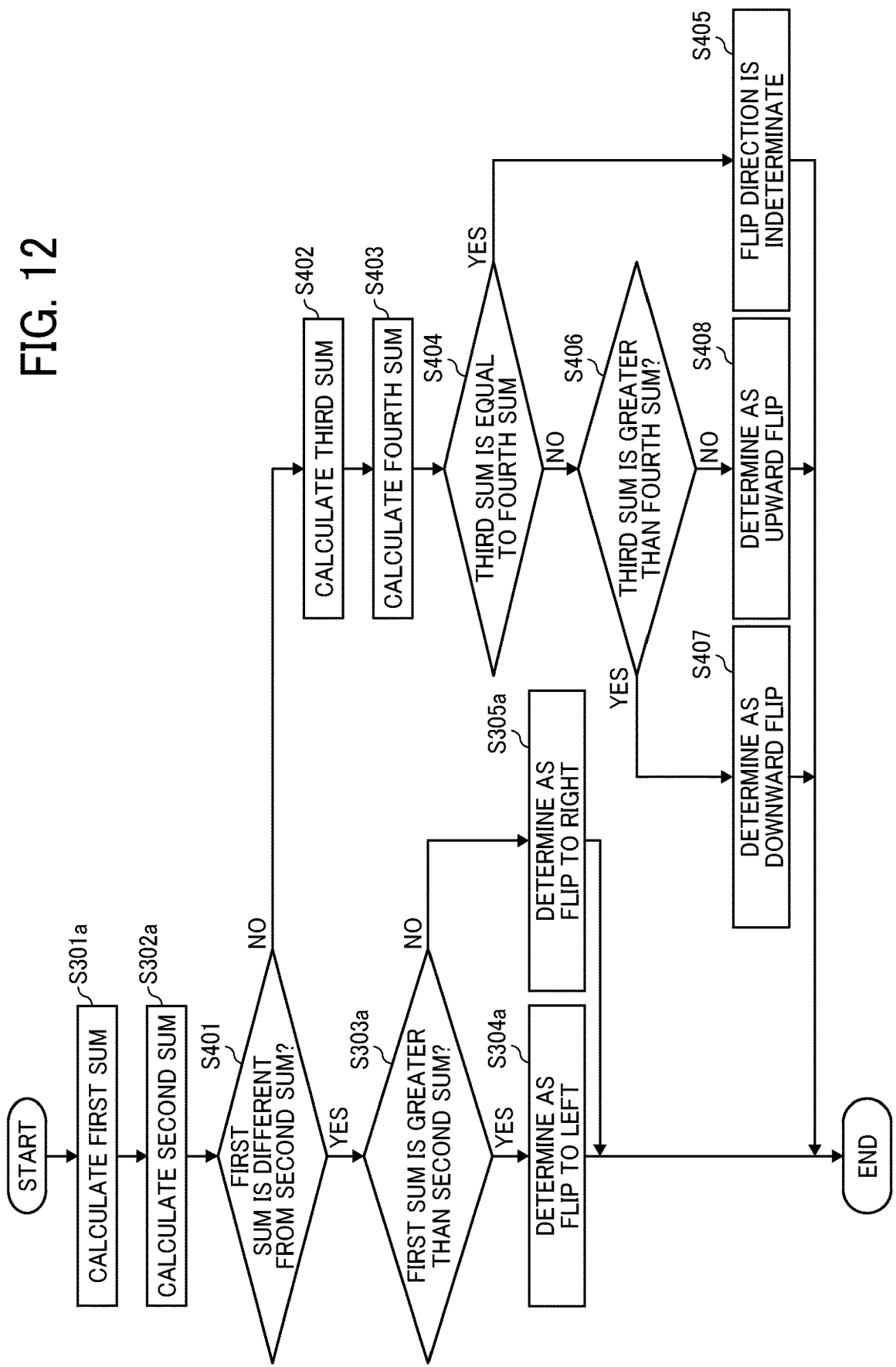
FIG. 12 is a flowchart of an example of a process performed by the flip-direction determiner according to another embodiment of the present disclosure.

FIG. 12 is a flowchart of another example of processing performed by the flip-direction determiner 408 according to another embodiment of the present disclosure. Note that the processing in FIG. 12 provides a detailed description of the process in step S111 in FIG. 6.

In step S401, the flip-direction determiner 408 determines whether the first total value is different from the second total value. When the first total value is equal to the second total value (No in step S401), the process proceeds to step S402. When the first total value differs from the second total value (Yes in step S401), the process proceeds to step S303.

Note that, in some embodiments, the flip-direction determiner 408 determines whether the absolute value of the difference between the first total value and the second total value is less than or equal to a predetermined value in step S401. In such a case, when the absolute value of the difference between the first total value and the second total value is less than or equal to a predetermined value, the process proceeds to step S402. When the absolute value of the difference between the first total value and the second total value is greater than the predetermined value, the process proceeds to step S303.

This configuration enables determination of a direction of flip of pages of document P without the harmful effect of environmental disturbance, such as ambient brightness of the image forming apparatus 100, the state of the illumination unit 206, and shadow of the user, even when the first total value differs from the second total value.

In step S402, the flip-direction determiner 408 sums up the number of image areas set with the difference flag for the upper side relative to the determination reference position. More specifically, the flip-direction determiner 408 sums up the number of difference flags stored in association with the image areas on the upper side relative to the determination reference position, so as to obtain a third total value. In the present embodiment, the third total value refers to the sum of the number of image areas set with the difference flags indicating the upper side relative to the determination reference position. A detailed description is given later of the process in step S402.

In step S403, the flip-direction determiner 408 sums up the number of image areas set with the difference flag indicating the lower side relative to the determination reference position. More specifically, the flip-direction determiner 408 sums up the number of difference flags stored in association with the image areas on the lower side relative to the determination reference position, so as to obtain a fourth total value. In the present embodiment, the fourth total value refers to the sum of the number of image areas set with the difference flags indicating the lower side relative to the determination reference position. A detailed description is given later of the process in step S403.

In step S404, the flip-direction determiner 408 compares the third total value obtained in step S402 with the fourth total value obtained in step S403. When the third total value is equal to fourth total value, the process proceeds to step S405. When the third total value is not equal to fourth total value, the process proceeds to step S406.

In step S405, the flip-direction determiner 408 fails to determine the direction of flip of pages of the document P being scanned by the document scanner 102. Thus, the flip-direction determiner 408 determines that the flip direction is indefinite in step S405.

In step S406, the flip-direction determiner 408 compares the third total value obtained in step S402 with the fourth total value obtained in step S403, to determine which total value is greater. When the third total value is greater than the fourth total value (Yes in step S406), the process proceeds to step S407. When fourth total value is greater than the third total value (No in step S406), the process proceeds to step S408.

In step S407, the flip-direction determiner 408 determines that the pages of the document P, which is being scanned by the document scanner 102, are flipped from upper side to lower side.

In step S408, the flip-direction determiner 408 determines that the pages of the document P, which is being scanned by the document scanner 102, are flipped from lower side to upper side.

Figure 13A:
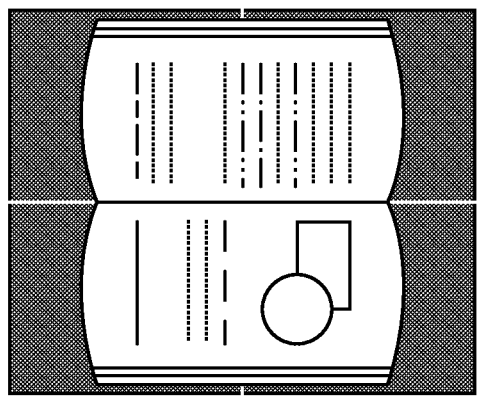
FIGS. 13A through 13E are illustrations of a method of determining a flip direction performed by the flip-direction determiner according to even another embodiment of the present disclosure.
Figure 13B:
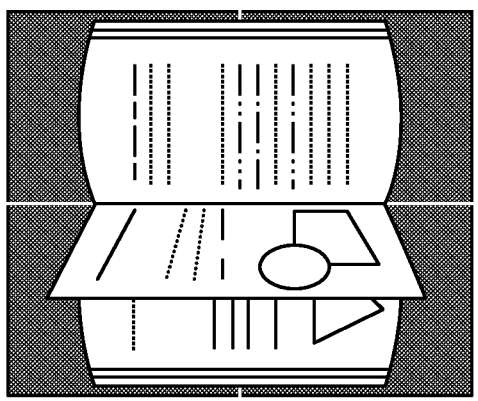
Figure 13C:
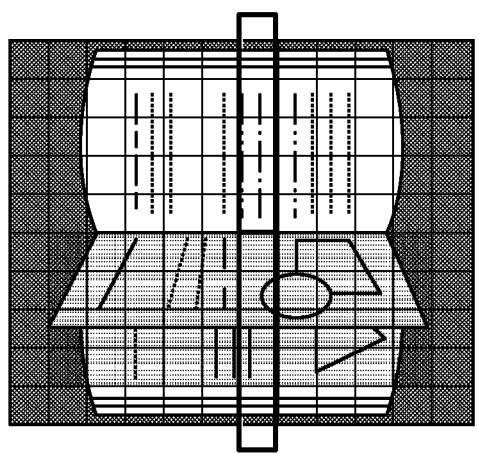

FIGS. 13A through 13E are illustrations of a method of determining a flip direction performed by the flip-direction determiner 408 according to another embodiment of the present disclosure. FIG. 13A is an illustration of an example of the reference-image data 413. FIG. 13B is an illustration of an example of the comparative-image data 414. FIG. 13C is an illustration of the determination result of the difference between the reference-image data 413 in FIG. 13A and the comparative-image data 414 in FIG. 13B.

Figure 13D:
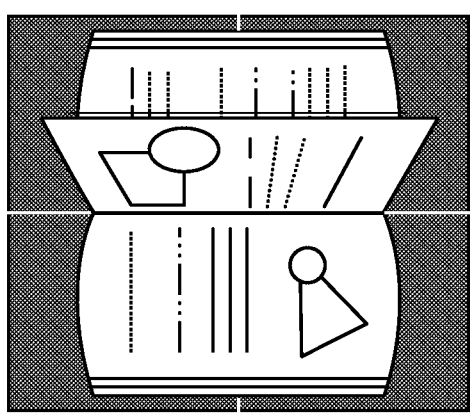
Figure 13E:
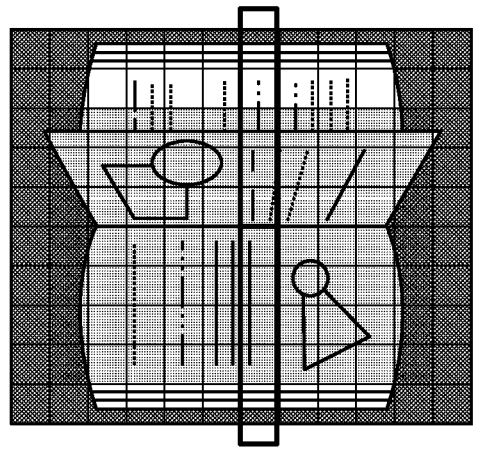

FIG. 13D is an illustration of another example of the comparative-image data 414. FIG. 13E is an illustration of a determination result of the difference between the reference-image data 413 in FIG. 13A and the comparative-image data 414 in FIG. 13D. FIGS. 13B and C are illustrations of the case in which the user moves a page for a short distance to flip the page, and FIGS. 13D and 13E are illustrations of the case in which the user moves a page for a long distance to flip the page, compared to the case in FIGS. 13B and 13C. In FIGS. 13A through 13E, the page of the document P is assumed to be flipped to upper side (in the upper direction) by the user. The following describes the processes in step S402 through step S408 performed by flip-direction determiner 408.

In scanning the document P with the document scanner 102, the user flips a page of the document P to the next after completion of a scan of the first facing pages, so as to scan the next facing pages. In this case, when the flip direction is in the upper direction, the pages of the document P are flipped from the lower side to the upper side. Accordingly, when the document P of right and left facing pages is placed on the document table 202 such that the user flips pages in a direction parallel to the main scanning direction, there is a more significant change in the image data at the lower side relative to the determination reference position of the image data captured by the area sensor 205, than the image data at the upper side does.

In contrast, when the flip direction is in the lower direction, the pages of the document P are flipped from the upper side to the lower side. Accordingly, there is a more significant change in the image data at the upper side relative to the determination reference position of the image data captured by the area sensor 205, than the image data at the lower side does.

The flip-direction determiner 408 determines which has more significantly changed between the image area at the upper side and the image area at the lower side relative to the determination reference position of the image data captured by the image sensor 205, and determines a flip direction based on the determination result. The flip-direction determiner 408 calculates the sum of the number of image areas set with difference flags for the upper side of the determination reference position to obtain a third total value. The flip-direction determiner 408 also calculates the sum of the number of image areas set with difference flags for the lower side of the determination reference position to obtain a fourth total value. When the third total value is greater than the fourth total value, the flip-direction determiner 408 determines that the pages of the document P are flipped to the lower side. When the fourth total value is greater than the third total value, the flip-direction determiner 408 determines that the pages of the document P are flipped to the upper side.

More specifically, the flip-direction determiner 408 obtains the third total value by figuring up the number of image areas set with difference flags within a third range, and obtains the fourth total value by figuring up the number of image areas set with difference flags within a fourth range.

More specifically, when the area division unit 405 divides each of the reference image data 413 and the comparative image data 414 into 120 image areas consisting of 10 areas in the main scanning direction and 12 areas in the sub-scanning direction, the third range includes first to fifth image areas from the top in the seventh line from the left, and the fourth range includes first to fifth image areas from the bottom in the seventh line from the left.

However, the third range and the fourth range are not limited to such ranges. Thus, in some embodiments, the third range includes any image area relating to the upper side relative to the determination reference position. Further, in some embodiments, the fourth range includes any image area relating to the left side relative to the determination reference position. In some cases, the user's finger or arm might be reflected in the reference-image data 413 or the comparative-image data 414. To exclude any image area in which the user's finger or arm might be reflected, the third range and the fourth range are set to include any image area only in the line close to the determination reference point.

Note that the image obtainer 404 obtains, as comparative-image data 414, image data captured by the area sensor 205 at a predetermined timing after completion of a scan of the first facing pages. Accordingly, when the user slowly turns a page of the document P after completion of a scan of the first facing pages, the user moves the page for a short distance during the time period from the time at which the scanning is completed to the time at which the comparative-image data 414 is obtained. In contrast, when the user quickly turns (flips) a page of the document P after completion of a scan of the first facing pages, the user moves the page for a long distance during the time period from the time at which the scanning is completed to the time at which the comparative-image data 414 is obtained, compared to the case in which the user slowly turns a page of the document P.

In the case of FIG. 13C in which the user moves the page for a short distance to flip the page, the difference determiner 407 determines the presence of the difference between the reference-image data 413 and the comparative-image data 414 only in the image area on the lower side relative to the determination reference position. Specifically, in the case of FIG. 13C, the flip-direction determiner 408 obtains a value of 0 for the third total of the third range and a value of 4 for the fourth total value of the fourth range. Thus, the fourth total value is greater than the third total value. That is, the difference determination unit 407 determines the presence of more differences between the reference-image data 413 and the comparative-image data 414 in the image areas on the lower side relative to the determination reference position, than the upper side does. As a result, the flip-direction determiner 408 determines that the direction of flipping a page of the document P is from lower side to the upper side.

In the case of FIG. 13E in which the user moves the page for a long distance to flip the page, the difference determiner 407 determines the presence of the difference between the reference-image data 413 and the comparative-image data 414 in image areas on both sides (the upper and lower sides) of the determination reference position. However, in this case, more image areas set with difference flags are present at the lower side of the determination reference position than the upper side does. Specifically, in the case of FIG. 13E, the flip-direction determiner 408 obtains a value of 3 for the third total of the third range and a value of 4 for the fourth total value of the fourth range. Thus, the fourth total value is greater than the third total value. That is, the difference determination unit 407 determines the presence of more differences between the reference-image data 413 and the comparative-image data 414 in the image areas on the lower side relative to the determination reference position, than the upper side does. As a result, the flip-direction determiner 408 determines that the direction of flipping a page of the document P is from lower side to the upper side.

In FIGS. 13A through 13E, the cases in which the pages of the document P are flipped from the lower side to the upper side are described. However, no limitation is intended thereby. Thus, in some embodiments, the pages of the document P are flipped from the upper side to the lower side, and the flip-direction determiner 408 determines the flip direction in the same manner as in the case of FIGS. 13A through 13E.

The processing performed by the flip-direction determiner 408 according to another embodiment of the present disclosure enables an accurate determination of a direction of flip of pages, in any case of when the document P of right and left facing pages is placed on the document table 202 so that the flip direction is parallel to the sub-scanning direction, when the document P of right and left facing pages is placed on the document table 202 such that the flip direction is parallel to the main scanning direction, and when the document P of vertically facing pages is placed on the document table 202.

The functions provided by the image forming apparatus 100 according to the above-described embodiments are implemented by causing computer to execute the above-described processing according to program coded in a programming language in the image forming apparatus 100 according to the above-described embodiments.

The program for implementing the image forming apparatus 100 according to the above-described embodiment is stored in a computer-readable recording medium. Accordingly, the program according to the above-described embodiment stored in such a recording medium is installed in the image forming apparatus 100 via the I/F unit 34.

Alternatively, the program according to the above-described embodiment is downloaded via the electric communication line such as Internet and installed in the image forming apparatus 100 via the I/F unit 34.

The above-described embodiments are applied to the image forming apparatus 100. However, no limitation is intended thereby. Thus, various modifications and improvements are possible. It is therefore to be understood that, within the scope of the appended claims, the disclosure of this patent specification may be practiced otherwise than as specifically described herein.

In the above-described embodiments, the case in which the reference-image data 413 is obtained before the area sensor 205 starts scanning the document P. However, no limitation is intended thereby. In some embodiments, the reference-image data 413 is obtained right after the area sensor 205's completion of scan of the document P, which means that the reference-image data 413 is captured before the user starts flipping the page of the document P. Further, the comparative-image data 414 is captured after the user's completion of flipping the page of the document P.

In the above description, the case in which the image obtainer 404 collectively stores, in the storage device 302, a set of a plurality of still-image data obtained during the time period between the time at which the instruction-information obtainer 403 first obtains the instruction to perform scanning and the time at which the instruction-information obtainer 403 obtains the instruction to terminate scanning, as scan-image data 415 is described. However, no limitation is intended thereby. Thus, the still-image data is stored as another scan-image data 415 in the storage device 302 each time the instruction-information obtainer 403 obtains an instruction to perform scanning. In this case, the page division unit 409 divides each scan-image data 415 into page units. At this time, the page sort unit 410 obtains the instruction information 412 from the instruction-information obtainer 403, and determines image data to be collected as one piece of processed image data 416 based on the instruction information 412.

In some embodiments, the page division unit 409 obtains the instruction information 413 output from the instruction-information obtainer 413, and determines scan-image data to be collected as one piece of processed image data 416 based on the obtained instruction-information 413. Thus, the page division unit 409 collectively divides a set of the scan-image data read from the storage device 302 into page units.

In the above description, the determination reference position is the center of each of the reference-image data 413 and the comparative-image data 414. However, no limitation is intended thereby. Thus, alternatively, in some embodiments, the determination reference position is the center of the document P. For example, the difference determiner 407 obtains the center of the document based on the reference-image data 413 and the comparative-image data 414. At this time, the difference determiner 407 determines the positions of the inflection points on the upper and lower sides or the left and right sides at the edge of the document P extracted from the reference-image data 413 and the comparative-image data 414, and sets the line connecting inflection points or any point on the line connecting the inflection points as the determination reference position.

First Aspect

An image scanning device according to the first aspect of the present disclosure includes an area sensor 205, an operation unit 105, an image obtainer 404, an area division unit 405, a feature-point extractor 406, a difference determiner 407, and a flip-direction determiner 408. The area sensor 205 captures an image of a document P of a plurality of pages placed to allow a user to flip the pages, with a predetermined frequency. The area sensor 205 further outputs the captured plurality of pieces of image data. The operation unit 105 receives a user's instruction to perform scanning the document P. Upon receiving the instruction at the operation unit 105, the image obtainer 404 obtains, as reference-image data, one of the plurality of pieces of image data output from the area sensor 205, and obtains, as comparative-image data, image data output from the area sensor 205 when a predetermined time elapses after obtaining the reference-image data. The area division unit 405 divides each of the reference-image data and the comparative-image data obtained by the image obtainer 404 into a plurality of image areas. The feature-point extractor 406 extracts a feature point of a certain pixel for each of the plurality of image areas divided by the area division unit 405 for each of the reference-image data and the comparative-image data. The difference determiner 407 compares pixel values of feature points in a common coordinate between the reference-image data and the comparative-image data to obtain a difference in pixel value in the common coordinate between the reference-image data and the comparative-image data. The difference determiner 407 identifies an image area containing a feature point with a difference in pixel value in the common coordinate, from the plurality of image areas divided by the area division unit 405, based on the obtained difference. The flip-direction determiner 408 identifies a direction of flip of pages of the document based on the image area containing a feature point with a difference in pixel value.

The configuration according to the first aspect enables determining a flip direction accurately without performing the processing for determining the flip direction at a short time period during the user's flip of a page.

Second Aspect

In the image scanning device according to the second aspect, the image obtainer 404 obtains image data read by the area sensor, from the area sensor. The image scanning device according to the second aspect further includes a storage device 302, a page division unit 409, and a page sort unit 410. The storage device 302 stores the image data obtained by the image obtainer 404 therein. The page division unit 409 divides the image data obtained by the image obtainer 404 into page by page. The page sort unit 410 sorts the image data divided into page by page by the page division unit 409, based on the flip direction determined by the flip-direction determiner 408, and stores the sorted image data in the storage device 302.

The configuration according to the second aspect enables sorting the readout-image data divided into page units based on the determined flip direction, and storing the sorted readout-image data in the storage device.

Third Aspect

In the image scanning device according to the third aspect of the present disclosure, the flip-direction determiner 408 determines the direction in which the user flips pages of the document P, based on a direction of an image area containing a feature point with a difference in pixel value relative to a determination reference position. Such an image area constitutes a plurality of image areas divided by the area division unit 405.

The configuration according to the third aspect enables determining a direction of flip of pages of the document based on the direction of an image area containing a feature point with a difference in pixel value of the divided plurality of image areas relative to the determination reference position.

Fourth Aspect

In the image scanning device according to the fourth aspect, the flip-direction determiner 408 determines that the flip direction is from the left to the right when the number of image areas including the feature point having the difference in pixel value on the left side relative to a reference position is greater than the number of image areas including the feature points having the difference in pixel value on the right side relative to the reference position. The flip-direction determiner 408 determines that the flip direction is from the right side to the left side when the number of image areas including the feature point having the difference in pixel value on the right side relative to the reference position is greater than the number of image areas including the feature point having the difference in pixel value on the left side relative to the reference position.

The configuration according to the fourth aspect enables determining that the flip direction is from the left to the right when the number of image areas including the feature point having the difference in pixel value on the left side relative to a reference position is greater than the number of image areas including the feature points having the difference in pixel value on the right side relative to the reference position.

The configuration further enables determining that the flip direction is from the right to the left when the number of image areas including the feature point having the difference in pixel value on the right side relative to the reference position is greater than the number of image areas including the feature point having the difference in pixel value on the left side relative to the reference position.

Fifth Aspect

In the image scanning device according to the fifth aspect, the flip-direction determiner 408 determines that the flip direction is from the lower side to the upper side when the number of image areas including the feature point having the difference in pixel value on the lower side relative to a reference position is greater than the number of image areas including the feature point having the difference in pixel value on the upper side relative to the reference position. The flip-direction determiner 408 determines that the flip direction is from the upper side to the lower side when the number of image areas including the feature point having the difference in pixel value on the upper side relative to the reference position is greater than the number of image areas including the feature point having the difference in pixel value on the lower side relative to the reference position.

The configuration according to the fifth aspect enables determining that the flip direction is from the lower side to the upper side when the number of image areas including the feature point having the difference in pixel value on the lower side relative to a reference position is greater than the number of image areas including the feature point having the difference in pixel value on the upper side relative to the reference position.

The configuration further enables determining that the flip direction is from the upper side to the lower side when the number of image areas including the feature point having the difference in pixel value on the upper side relative to the reference position is greater than the number of image areas including the feature point having the difference in pixel value on the lower side relative to the reference position.

Sixth Aspect

In the image scanning device according to the sixth aspect, the difference determiner 407 performs determination processing only on image areas included within a predetermined range in a plurality of image areas divided by the area division unit 405.

The configuration according to the sixth aspect enables performing determination processing only on image areas included within a predetermined range in a plurality of image areas divided by the area division unit 405.

Seventh Aspect

In the image scanning device according to the seventh aspect, the determination reference position is the center of each of a plurality of image data obtained by the image obtainer 404.

The configuration according to the seventh aspect allows the determination reference position to be the center of each of obtained plurality of image data.

Eighth Aspect

An image forming apparatus according to the eighth aspect includes the image scanning device according to any of the first aspect to the seventh aspect.

The configuration according to the ninth aspect allows the image forming apparatus to include the above-described image scanning device.

Ninth Aspect

An image scanning method according to the ninth aspect includes capturing an image of a document including a plurality of pages with a predetermined frequency to output a plurality of pieces of image data by the area sensor 205, the document being placed to allow flipping the pages; receiving an instruction to perform scanning the document, from an outside; obtaining reference-image data out of the plurality of pieces of image data output by the image sensor 205 in response to a reception of the instruction in the receiving; obtaining comparative-image data output from the image sensor when a predetermined time elapses after obtaining the reference-image data; dividing each of the reference-image data and the comparative-image data into a plurality of image areas; extracting a feature point of a certain pixel for each of the plurality of image areas of each of the reference-image data and the comparative-image data; comparing pixel values of feature points in a common coordinate between the reference-image data and the comparative-image data to obtain a difference in pixel value in the common coordinate between the reference-image data and the comparative-image data; identifying an image area containing a feature point with a difference in pixel value in the common coordinate, from the plurality of image areas divided in the dividing, based on the difference between the reference-image data and the comparative-image data; and determining a direction of flip of pages of the document based on the image area containing a feature point with a difference in pixel value.

The operations and effects are the same as those of the first aspect.

Tenth Aspect

An image scanning program according to the tenth aspect causes computer to execute the image scanning method according to the ninth aspect.

The configuration according to the tenth aspect enables the processor to perform the image scanning method according to the ninth aspect.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image scanning device comprising:
   an image sensor to capture an image of a document including a plurality of pages at a given frequency and output a plurality of pieces of image data, the document being placed to allow flipping the pages;
   an operation unit to receive an instruction to perform scanning the document, from an outside; and
   circuitry to:
   acquire reference-image data out of the plurality of pieces of image data output by the image sensor in response to a reception of the instruction by the operation unit;
   acquire comparative-image data output from the image sensor when a given time elapses after acquiring the reference-image data;
   divide each of the reference-image data and the comparative-image data into a plurality of image areas;
   extract a feature point of a given pixel for each of the plurality of image areas of each of the reference-image data and the comparative-image data;
   compare pixel values of the feature points in a coordinate common between the reference-image data and the comparative-image data to determine a difference in pixel value in the coordinate common between the reference-image data and the comparative-image data;
   identify an image area including at least one feature point having a difference in pixel value in the common coordinate, from the divided plurality of image areas based on the difference between the reference-image data and the comparative-image data; and
   identify a direction of flip of pages of the document based on the image area including the at least one feature point having the difference in pixel value.

2. The image scanning device according to claim 1, further comprising a memory to store image data output from the image sensor,
   wherein the circuitry is further configured to:
   divide the image data of the captured image of the document into page by page;
   sort the image data divided into page by page, based on the identified direction of flip of pages of the document; and
   store the sorted image data in the memory.

3. The image scanning device according to claim 1, wherein the circuitry is further configured to determine a direction of the image area including the feature point having a difference in pixel value relative to a reference point, and identify the direction of flip of pages of the document based on the determined direction.

4. The image scanning device according to claim 1, wherein the circuitry is further configured to:
   determine that the direction of flip of pages of the document is from a left side to a right side when the number of image areas including the feature point having the difference in pixel value on the left side relative to a reference position is greater than the number of image areas including the feature point having the difference in pixel value on the right side relative to the reference position, and
   determine that the direction of flip of pages of the document is from the right side to the left side when the number of image areas including the feature point having the difference in pixel value on the right side relative to the reference position is greater than the number of image areas including the feature point having the difference in pixel value on the left side relative to the reference position.

5. The image scanning device according to claim 1, wherein the circuitry is further configured to:
   determine that the direction of flip of pages of the document is from a lower side to an upper side when the number of image areas including the feature point having the difference in pixel value on the lower side relative to a reference position is greater the number of image areas including the feature point having the difference in pixel value on the upper side relative to the reference position, and
   determine that the direction of flip of pages of the document is from the upper side to the lower side when the number of image areas including the feature point having the difference in pixel value on the upper side relative to the reference position is greater than the number of image areas including the feature point having the difference in pixel value on the lower side relative to the reference position.

6. The image scanning device according to claim 1, wherein the circuitry is further configured to determine a difference between image areas included within a given range in the plurality of image areas divided by the circuitry.

7. The image scanning device according to claim 1, wherein the determination reference position is the center of each of the plurality of image data acquired by the circuitry.

8. An image forming apparatus comprising the image scanning device according to claim 1.

9. An image scanning method comprising:
   capturing an image of a document including a plurality of pages at a given frequency to output a plurality of pieces of image data, the document being placed to allow flipping the pages;
   receiving an instruction to perform scanning the document, from an outside;
   acquiring reference-image data out of the plurality of pieces of image data output in response to a reception of the instruction in the receiving;
   acquiring comparative-image data when a given time elapses after acquiring the reference-image data in the acquiring;
   dividing each of the reference-image data and the comparative-image data into a plurality of image areas;
   extracting a feature point of a certain pixel for each of the plurality of image areas of each of the reference-image data and the comparative-image data;
   comparing pixel values of the feature points in a coordinate common between the reference-image data and the comparative-image data to determine a difference in pixel value in the coordinate common between the reference-image data and the comparative-image data;
   identifying an image area including at least one feature point having a difference in pixel value in the common coordinate from the plurality of image areas divided in the dividing, based on the difference between the reference-image data and the comparative-image data; and identifying a direction of flip of pages of the document based on the image area including the at least one feature point having the difference in pixel value.

10. A non-transitory computer readable storage medium storing a program that causes the image scanning method according to claim 9.

* * * * *